(12) United States Patent
Nainar et al.

(10) Patent No.: US 10,979,350 B1
(45) Date of Patent: Apr. 13, 2021

(54) DISTRIBUTED DETNET VALIDATION USING DEVICE/SEGMENT SPECIFIC BITSTRINGS IN DETNET OAM ACH

(71) Applicant: Cisco Technology, Inc., San Jose, CA (US)

(72) Inventors: Nagendra Kumar Nainar, Morrisville, NC (US); Carlos M. Pignataro, Cary, NC (US); Pascal Thubert, Roquefort les Pins (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/685,096

(22) Filed: Nov. 15, 2019

(51) Int. Cl.
  *H04L 12/24* (2006.01)
  *H04L 12/26* (2006.01)
  (Continued)

(52) U.S. Cl.
  CPC .......... *H04L 45/44* (2013.01); *H04L 41/0668* (2013.01); *H04L 43/12* (2013.01);
  (Continued)

(58) Field of Classification Search
  CPC ..... H04L 41/0668; H04L 43/10; H04L 43/12; H04L 43/50; H04L 45/02; H04L 45/44;
  (Continued)

(56) References Cited

U.S. PATENT DOCUMENTS 7,283,563 B1 * 10/2007 Allan .................. H04L 41/0873
  370/469
8,160,055 B1 * 4/2012 Nadeau .................. H04L 45/68
  370/351

(Continued)

FOREIGN PATENT DOCUMENTS

WO  WO-2015009667 A1 * 1/2015 ............. H04L 43/10

OTHER PUBLICATIONS

Thubert, "Converging over Deterministic Networks for an Industrial Internet", Thesis, Universite Bretagne Loire, Mar. 16, 2017, [online], [retrieved on Aug. 22, 2019]. Retrieved from the Internet: URL: <https://tel.archives-ouvertes.fr/tel-01828288/document> 166 pages.

(Continued)

*Primary Examiner* — Aaron N Strange
(74) *Attorney, Agent, or Firm* — Leon R. Turkevich

(57) ABSTRACT

In one embodiment, a method comprises: establishing a wireless DetNet track for an identified DetNet flow of DetNet packets, and the DetNet track comprising DetNet devices connected by allocated DetNet segments distinct from IP-based connections; causing, by the network device, a DetNet device(s) to execute distributed validating of any one or more DetNet operations by a DetNet forwarding hardware circuit in a DetNet device under test among the DetNet devices, the distributed validating including: generating a DetNet OAM (d-OAM) probe message comprising an ACH header specifying a DetNet validation identifier and a selected bitstring; validating the DetNet forwarding hardware circuit based on outputting the d-OAM probe message, the d-OAM probe message causing a CPU in the DetNet device(s) to selectively generate an IP-based probe response indicating whether a DetNet operation(s) was executed by the DetNet forwarding hardware circuit, independent of an execution speed of any DetNet forwarding hardware circuit.

20 Claims, 21 Drawing Sheets

(51) Int. Cl.
*H04L 12/851* (2013.01)
*H04L 12/751* (2013.01)
*H04L 12/721* (2013.01)
*H04L 12/723* (2013.01)
*H04L 12/70* (2013.01)

(52) U.S. Cl.
CPC .............. *H04L 43/50* (2013.01); *H04L 45/02* (2013.01); *H04L 45/507* (2013.01); *H04L 47/2483* (2013.01); *H04L 2012/5625* (2013.01)

(58) Field of Classification Search
CPC ............... H04L 45/507; H04L 47/2443; H04L 2012/5625
See application file for complete search history.

(56) References Cited

U.S. PATENT DOCUMENTS

| | | | |
|---|---|---|---|
| 9,226,292 | B2 | 12/2015 | Thubert et al. |
| 9,306,830 | B2 * | 4/2016 | Robitaille ........... H04L 43/0835 |
| 9,320,036 | B2 | 4/2016 | Thubert et al. |
| 9,456,444 | B2 | 9/2016 | Thubert et al. |
| 9,515,914 | B2 * | 12/2016 | Vasseur ................... H04L 45/42 |
| 10,103,981 | B2 | 10/2018 | Pignataro et al. |
| 10,142,227 | B2 | 11/2018 | Thubert et al. |
| 10,153,967 | B2 | 12/2018 | Callon et al. |
| 10,313,216 | B2 | 6/2019 | Zheng et al. |
| 2003/0110276 | A1 * | 6/2003 | Riddle .................... H04L 41/12 709/230 |
| 2014/0003224 | A1 * | 1/2014 | Guilbaud ............ H04L 41/0677 370/216 |
| 2015/0023328 | A1 * | 1/2015 | Thubert ............ H04W 72/0446 370/336 |
| 2016/0099859 | A1 * | 4/2016 | Mohammadi ........... H04L 45/74 370/248 |
| 2016/0248886 | A1 * | 8/2016 | Thubert .................. H04L 41/50 |
| 2017/0126481 | A1 * | 5/2017 | Pignataro ................ H04L 45/22 |
| 2019/0116000 | A1 * | 4/2019 | Thubert ................ H04L 1/0045 |
| 2019/0149468 | A1 | 5/2019 | Pfister et al. |
| 2020/0084143 | A1 * | 3/2020 | Gandhi ................... H04L 69/22 |
| 2020/0228446 | A1 * | 7/2020 | Geng ................. H04L 47/2483 |

OTHER PUBLICATIONS

Farkas et al., "Deterministic Networking (detnet)", Oct. 28, 2019, [online], [retrieved on Oct. 29, 2019]. Retrieved from the Internet: URL: <https://datatracker.ietf.org/wg/detnet/about/>, pp. 1-4.

Swallow et al., "Label Switching Router Self-Test", Network Working Group, Internet Draft, May 2007, [online], [retrieved on Oct. 29, 2019]. Retrieved from the Internet: URL: <https://tools.ietf.org/pdf/draft-ietf-mpls-lsr-self-test-07.pdf>, pp. 1-15.

Mirsky et al., "Operations, Administration and Maintenance (OAM) for Deterministic Networks (DetNet) with IP Data Plane", DetNet Working Group, Internet Draft, Jul. 7, 2019, [online], [retrieved on Oct. 10, 2019]. Retrieved from the Internet: URL: <https://tools.ietf.org/pdf/draft-mirsky-detnet-ip-oam-00.pdf>, pp. 1-6.

Mirsky et al., "Operations, Administration and Maintenance (OAM) for Deterministic Networks (DetNet)", DetNet Working Group, Internet Draft, May 22, 2019, [online], [retrieved on Oct. 10, 2019]. Retrieved from the Internet: URL: <https://www.ietf.org/archive/id/draft-mirsky-detnet-oam-03.txt>, pp. 1-11.

Thubert, Ed., et al., "BIER-TE extensions for Packet Replication and Elimination Function (PREF) and OAM", BIER, Internet Draft, Mar. 3, 2018, [online], [retrieved on Oct. 29, 2019]. Retrieved from the Internet: URL: <https://tools.ietf.org/pdf/draft-thubert-bier-replication-elimination-03.pdf>, pp. 1-15.

Thubert, Ed., et al., "Reliable and Available Wireless Technologies", RAW, Internet Draft, Jul. 1, 2019, [online], [retrieved on Oct. 14, 2019]. Retrieved from the Internet: URL: <https://tools.ietf.org/pdf/draft-thubert-raw-technologies-03.pdf>, pp. 1-40.

Sun, Ed., et al., "Label Switched Path (LSP) Data Path Delay Metrics in Generalized MPLS and MPLS Traffic Engineering (MPLS-TE) Networks", Internet Engineering Task Force (IETF), Request for Comments: 6777, Nov. 2012, [online], [retrieved on Oct. 29, 2019]. Retrieved from the Internet: URL: <https://tools.ietf.org/pdf/rfc6777.pdf>, pp. 1-29.

* cited by examiner

DISTRIBUTED DETNET VALIDATION USING DEVICE/SEGMENT SPECIFIC BITSTRINGS IN DETNET OAM ACH

TECHNICAL FIELD

The present disclosure generally relates to distributed Deterministic Network (DetNet) validation using device/segment-specific bitstrings in a DetNet Operations, Administration and Management (OAM) Associated Channel Header (ACH).

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Deterministic Networking (DetNet) is a relatively new architecture defined to carry real time application data traffic with extremely stringent Service Level Agreement (SLA) requirements, including very low data loss and controlled latency. DetNet uses "PREOP"—-Packet Replication, Elimination, Ordering functions—to establish redundancy across a DetNet track having DetNet-compliant path segments, where the Packet Replication (PR) function can replicate the data packets over different DetNet path segments, Packet Elimination (PE) can ensure and avoid duplication by eliminating redundant packets at a merge point of the DetNet path segments. Packet Ordering (PO) can ensure packets are delivered in order.

The stringent requirements of DetNet require swift execution of DetNet forwarding decisions in the "forwarding plane" (executed by dedicated forwarding hardware circuitry), as CPU-based execution (typically used for Internet Protocol (IP) based "control plane" decisions) is too slow for DetNet forwarding decisions. Hence, DetNet is particularly beneficial for responding to variations in wireless data links of a wireless data network.

A particular problem with DetNet is that the swift execution of DetNet forwarding decisions in the forwarding plane is that a local CPU executing a control plane, let alone a remote network controller is too slow and therefore incapable of monitoring or testing any DetNet forwarding decisions by a DetNet device. Moreover, the stringent SLA requirements in the DetNet forwarding plane prevent any possible packet processing or error evaluation that would otherwise delay forwarding of a DetNet packet.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
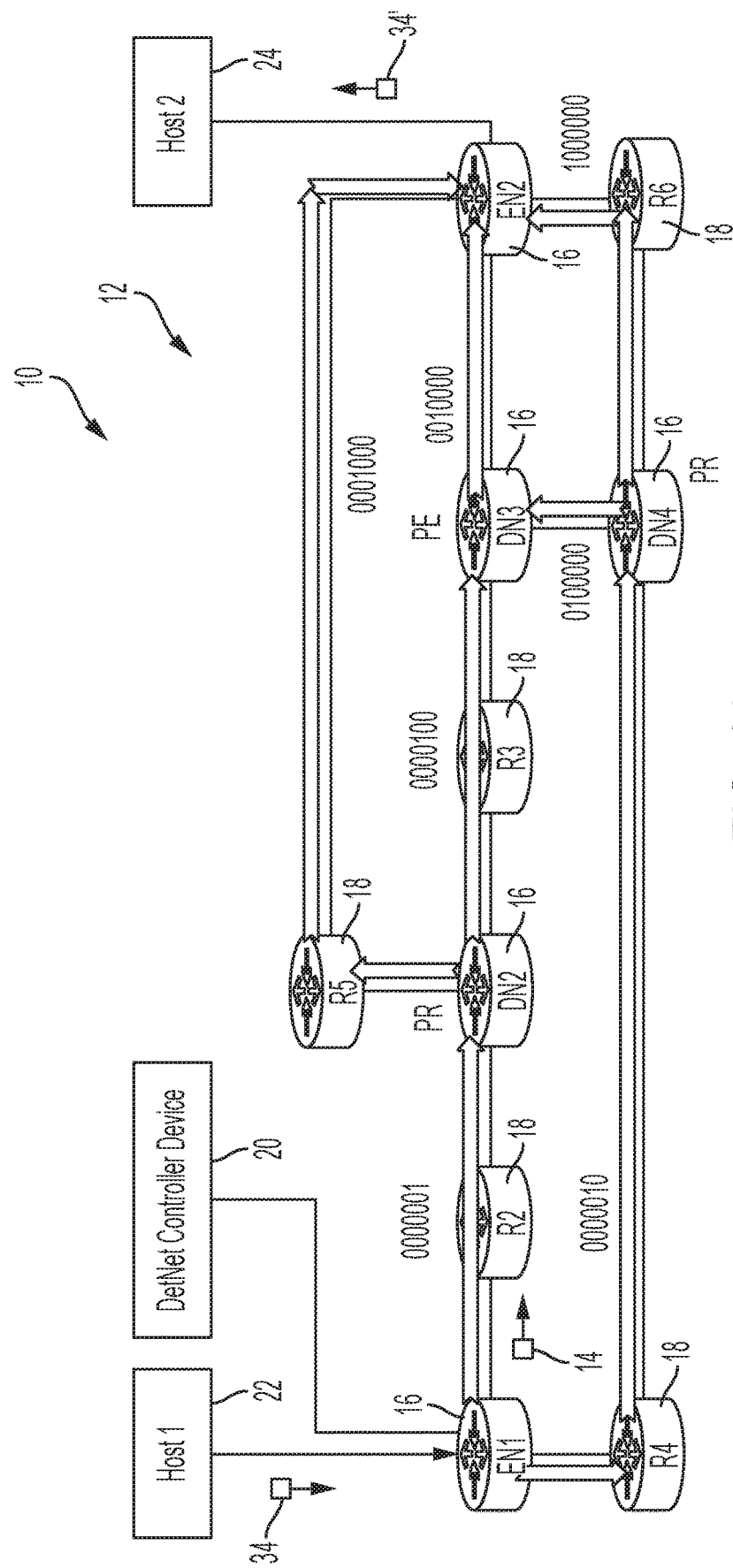
FIGS. 1A-1F illustrate an example system having an apparatus for causing execution of distributed validation of DetNet operations, executed by a DetNet forwarding hardware circuit in a DetNet device of a DetNet network, using a DetNet-compliant OAM probe message specifying a validation identifier and a selected bitstring identifying selected DetNet segments, according to an example embodiment.

In one embodiment, a method comprises: establishing, by a network device in an Internet Protocol (IP) data network, a wireless deterministic network (DetNet) track for an identified DetNet flow of DetNet packets, and the DetNet track comprising DetNet devices connected by allocated DetNet segments, each DetNet device configured for providing guaranteed deterministic transport of the identified DetNet flow along the corresponding allocated DetNet segment, each allocated DetNet segment distinct from an IP-based connection sharing a data link with the allocated DetNet segment; and causing, by the network device, one or more of the DetNet devices to execute distributed validating of any one or more DetNet operations by a DetNet forwarding hardware circuit in a DetNet device under test among the DetNet devices. The distributed validating includes generating a DetNet Operations, Administration and Management (OAM) (d-OAM) probe message comprising an Associated Channel Header (ACH) specifying a DetNet validation identifier and a selected bitstring, the selected bitstring identifying (1) at least one of selected DetNet segments among the allocated DetNet segments, or (2) at least one of selected DetNet devices among the DetNet devices; validating the DetNet forwarding hardware circuit based on outputting the d-OAM probe message, the d-OAM probe message causing one or more of the DetNet devices to selectively generate an IP-based probe response indicating whether the any one or more DetNet operations was executed by the DetNet forwarding hardware circuit. The IP-based probe response is generated based on the DetNet validation identifier and the selected bitstring causing the corresponding DetNet forwarding hardware circuit to punt the d-OAM probe message to a corresponding processor circuit that generates the IP-based probe response independent of an execution speed of any DetNet forwarding hardware circuit.

In another embodiment, one or more non-transitory tangible media encoded with logic for execution by a machine and when executed by the machine operable for: establishing, by a network device in an Internet Protocol (IP) data network, a wireless deterministic network (DetNet) track for an identified DetNet flow of DetNet packets, and the DetNet track comprising DetNet devices connected by allocated DetNet segments, each DetNet device configured for providing guaranteed deterministic transport of the identified DetNet flow along the corresponding allocated DetNet segment, each allocated DetNet segment distinct from an IP-based connection sharing a data link with the allocated DetNet segment; and causing, by the network device, one or more of the DetNet devices to execute distributed validating of any one or more DetNet operations by a DetNet forwarding hardware circuit in a DetNet device under test among the DetNet devices. The distributed validating includes: generating a DetNet Operations, Administration and Management (OAM) (d-OAM) probe message comprising an Associated Channel Header (ACH) specifying a DetNet validation identifier and a selected bitstring, the selected bitstring identifying (1) at least one of selected DetNet segments among the allocated DetNet segments, or (2) at least one of selected DetNet devices among the DetNet devices; validating the DetNet forwarding hardware circuit based on outputting the d-OAM probe message, the d-OAM probe message causing one or more of the DetNet devices to selectively generate an IP-based probe response indicating whether the any one or more DetNet operations was executed by the DetNet forwarding hardware circuit; the IP-based probe response generated based on the DetNet validation identifier and the selected bitstring causing the corresponding DetNet forwarding hardware circuit to punt the d-OAM probe message to a corresponding processor circuit that generates the IP-based probe response independent of an execution speed of any DetNet forwarding hardware circuit.

In another embodiment, an apparatus is implemented as a physical machine and comprises non-transitory machine readable media configured for storing executable machine readable code; a device interface circuit comprising a deterministic network (DetNet) forwarding hardware circuit; and a processor circuit. The processor circuit is configured for executing the machine readable code, and when executing the machine readable code operable for: establishing, by the apparatus implemented as a network device in an Internet Protocol (IP) data network, a wireless DetNet track for an identified DetNet flow of DetNet packets, and the DetNet track comprising DetNet devices connected by allocated DetNet segments, each DetNet device configured for providing guaranteed deterministic transport of the identified DetNet flow along the corresponding allocated DetNet segment, each allocated DetNet segment distinct from an IP-based connection sharing a data link with the allocated DetNet segment; causing, by the network device, one or more of the DetNet devices to execute distributed validating of any one or more DetNet operations by a DetNet forwarding hardware circuit in a DetNet device under test among the DetNet devices. The distributed validating includes: generating a DetNet Operations, Administration and Management (OAM) (d-OAM) probe message comprising an Associated Channel Header (ACH) specifying a DetNet validation identifier and a selected bitstring, the selected bitstring identifying (1) at least one of selected DetNet segments among the allocated DetNet segments, or (2) at least one of selected DetNet devices among the DetNet devices; validating the DetNet forwarding hardware circuit based on outputting the d-OAM probe message, the d-OAM probe message causing one or more of the DetNet devices to selectively generate an IP-based probe response indicating whether the any one or more DetNet operations was executed by the DetNet forwarding hardware circuit; the IP-based probe response generated based on the DetNet validation identifier and the selected bitstring causing the corresponding DetNet forwarding hardware circuit to punt the d-OAM probe message to a corresponding processor circuit that generates the IP-based probe response independent of an execution speed of any DetNet forwarding hardware circuit.

DETAILED DESCRIPTION

Particular embodiments can cause one or more DetNet devices in a wireless DetNet network to execute self-initiated distributed validation of self-selected DetNet operations that are executed by DetNet forwarding hardware circuitry in a DetNet device under test. The self-initiated distributed validation is based on a DetNet device initiating (e.g., along a DetNet track) a generating a DetNet Operations, Administration and Management (OAM) (d-OAM) probe message. The DetNet device initiating the d-OAM probe message also is referred to as the "testing" DetNet device. The d-OAM probe message comprises an Associated Channel Header (ACH) specifying a DetNet validation identifier and a selected bitstring. The selected bitstring can identify selected DetNet segments among the allocated DetNet segments, or selected DetNet devices among the DetNet devices.

Hence, the example embodiments configure the DetNet devices along a DetNet track of an identified DetNet flow to participate in distributed validation of DetNet operations based on selective "punting" by DetNet forwarding hardware circuitry in response to the d-OAM probe message specifying a selected bitstring that matches a bit position identified by the DetNet forwarding hardware circuitry, and an associated DetNet validation identifier. The punted d-OAM probe message enables a corresponding Central Processing Unit (CPU) in a DetNet device to selectively generate an IP-based probe response to the punted d-OAM message (based on the DetNet validation identifier) for delivery to the testing DetNet device via an IP connection. Hence, the IP-based probe response is independent of the faster execution speed of the DetNet forwarding hardware circuitry.

A description will first be provided of example embodiments that use selected bitstrings to identify at least selected DetNet segments among allocated DetNet segments of a DetNet track, followed by a description of example embodiments using selected bitstrings for identification of at least selected DetNet devices along a DetNet track.

Selective DETNET Path Validation Using a Bitstring Identifying DETNET Segments in Embedded Metadata in an ACH FIG. 1A illustrates an example Internet Protocol (IP) based data network 10 comprising a wireless deterministic network (DetNet) track 12 for deterministic transport of an identified DetNet flow of DetNet packets 14, according to an example embodiment. The wireless DetNet track 12 includes DetNet-capable network devices EN1, EN2, DN2, DN3, and DN4 16, and non-DetNet capable transit devices R2, R3, R4, R5, and R6 18. The data network 10 also can include a DetNet controller device 20, a source host network device 22 configured for supplying time-sensitive traffic 34 for insertion as DetNet traffic into the DetNet track 12, and a second host network device 24 configured for consuming the time-sensitive traffic 34' generated by the first host network device 24 and output by the egress DetNet device "EN2" 16 of the DetNet track 12.

According to an example embodiment, each segment is allocated (e.g., by the DetNet controller device 20 or another network device, for example one or more of the DetNet-capable devices EN1, EN2, DN2, DN3, and/or DN4 16) a unique bit position within a bitmap (i.e., "bitstring"). For example: the DetNet segment EN1→DN2 (via R2) is allocated the unique bitmap "0000001" (binary) (i.e., bit position "1"); the DetNet segment EN1→DN4 (via R4) is allocated the unique bitmap "0000010" (i.e., bit position "2"); the DetNet segment DN2→DN3 (via R3) is allocated the unique bitmap "0000100" (i.e., bit position "3"); the DetNet segment DN2→EN2 (via R5) is allocated the unique bitmap "0001000" (i.e., bit position "4"); the DetNet segment DN3→EN2 is allocated the unique bitmap "0010000" (i.e., bit position "5"); the DetNet segment DN4→DN3 is allocated the unique bitmap "0100000" (i.e., bit position "6"); and the DetNet segment DN4→EN2 (via R6) is allocated the unique bitmap "1000000" (i.e., bit position "7").

Figure 1B:
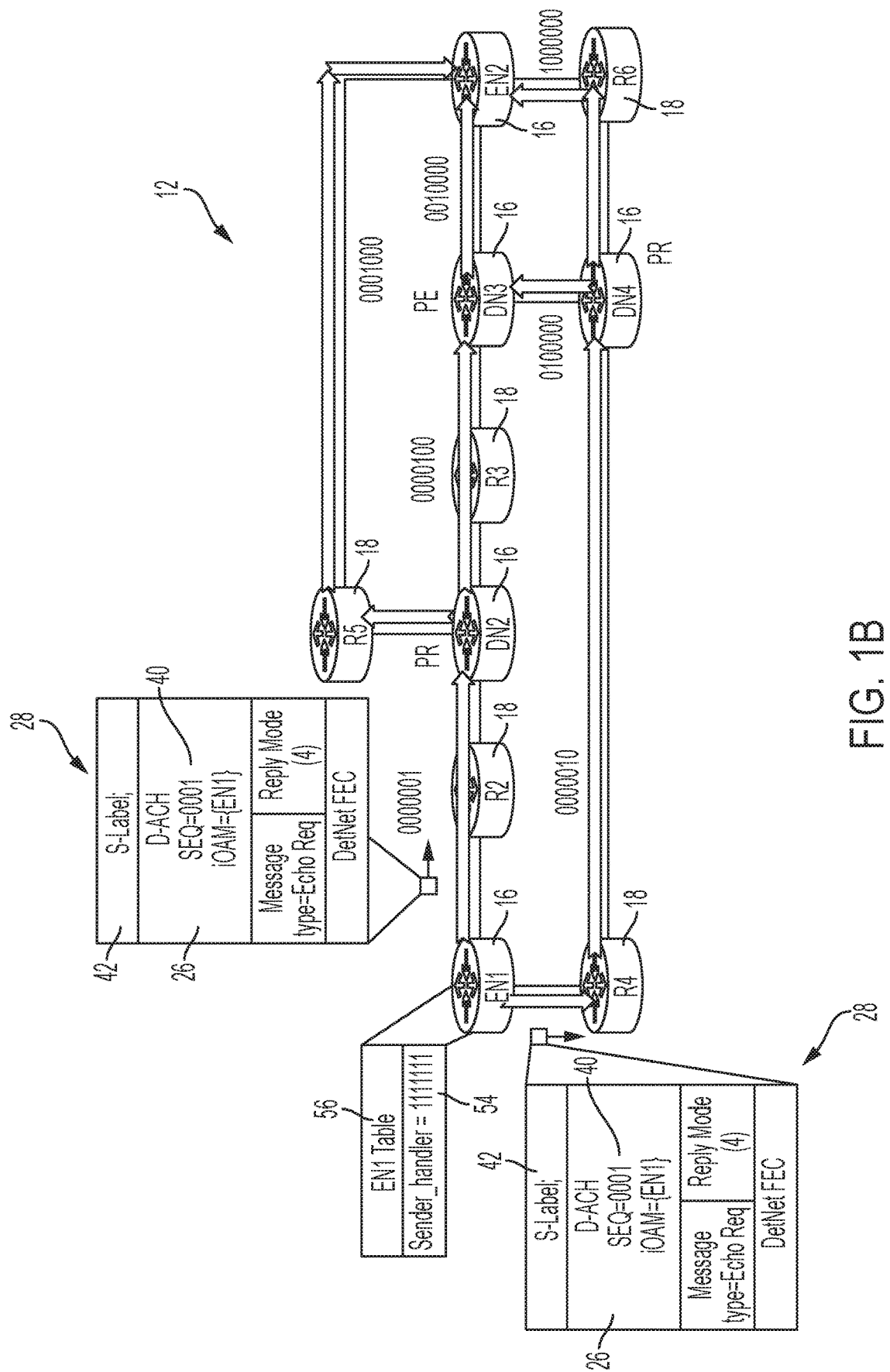
Figure 2:
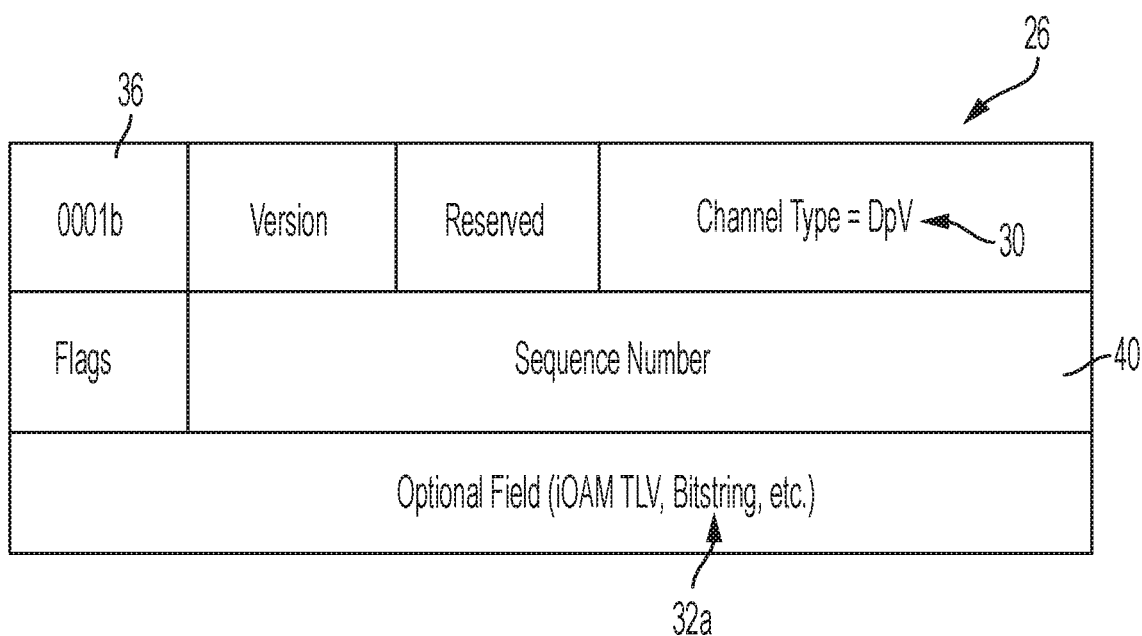
FIG. 2 illustrates an example DetNet-compliant Associated Channel Header (d-ACH) for a DetNet Operations, Administration, and Management (OAM) (d-OAM) probe message specifying a validation identifier and a bitstring of selected DetNet segments for distributed validation of DetNet operations, according to an example embodiment.

FIG. 2 illustrates an example DetNet-compliant Associated Channel Header (d-ACH) 26 for a DetNet Operations, Administration, and Management (OAM) (d-OAM) probe message (28 of FIG. 1B). The d-ACH 26 specifies a channel-type defined as "Dataplane PREOF Validation" (DpV) (i.e., DetNet validation identifier) 30, and a subsequent "Bit-String" identifier (e.g., 32 bits) 32a, described below. Optional Type-Length-Value fields can be added within the DetNet control word. The d-ACH 26 also specifies a DetNet control word identifier 36 specifying "0001" (binary) in the first nibble of the control word: the DetNet control word identifier 36 enables DetNet forwarding hardware circuitry (38 of FIG. 12) to identify the ACH header as a d-ACH 26 of a d-OAM probe message 28, as opposed to in-band DetNet data packets (carrying application data generated by the source host network device 22 and specifying a first nibble of "0000b"). The d-ACH 26 also includes a sequence number field 40 for identifying a relative sequence of the corresponding d-OAM probe message 28 in an identified DetNet flow of data packets.

According to an example embodiment, only the relevant DetNet network devices 16 serving as a segment endpoint for a given DetNet segment need be configured to respond to the corresponding unique bitmap 32a for the DetNet segment; for example, DN2 only needs be configured to respond to the bit position "1" ("0000001") for the segment from EN1→DN2, hence DN2 does not need to know about any other bitstrings or any other path of the associated DetNet traffic; similarly, DN3 only needs be configured to respond to the bit position "3" ("0000100") for the segment from DN2→DN3, hence DN3 does not need to know about any other bitstrings or any other path.

As shown in FIG. 1A, EN1 16 as a DetNet ingress node for the DetNet track 12 can classify the incoming data traffic 34 as DetNet traffic requiring forwarding over a wired and/or wireless DetNet track: EN1 can encapsulate with headers (e.g., the d-ACH specifying "0000b" in the first nibble, a DetNet "service" label ("S-label") 42, sequence number etc.), and EN 1 can replicate (as a Packet Replicator "PR") and output one copy of the encapsulated DetNet data packet to DN2 and another copy to DN4.

DN2 can respond to receiving the encapsulated DetNet data packet by replicating and sending the encapsulated packet to EN2 via R5 and DN3 via R3. DN4 as packet replicator can replicate two copies of the encapsulated packet to DN3 and EN2 (via R6).

DN3 can execute elimination in response to receiving two copies of the same encapsulated DetNet data packet from DN2 and DN4 (as a Packet Eliminator "PE"), based on identifying both packets from DN2 and DN4 have the same sequence number (that was inserted by EN1), and forwarding a single copy of the encapsulated DetNet data packet to EN2, causing EN2 to decapsulate the data packet and send the time-sensitive data traffic 34' to the destination host network device 24.

According to an example embodiment, validation of each DetNet segment (to ensure each DetNet segment is still operation) can be executed based on a network device (e.g., the ingress node EN1, a DetNet controller device 20, etc.) using the above-identified unique bitmaps for out-of-band ("OOB") d-OAM probe messages 28 that do not carry any application data, but can follow "downstream" along the DetNet segments of the wireless DetNet track 12 and/or "upstream" relative the wireless DetNet track 12, via IP-based connections sharing the same (link-layer) data links as the DetNet segments.

Figure 3A:
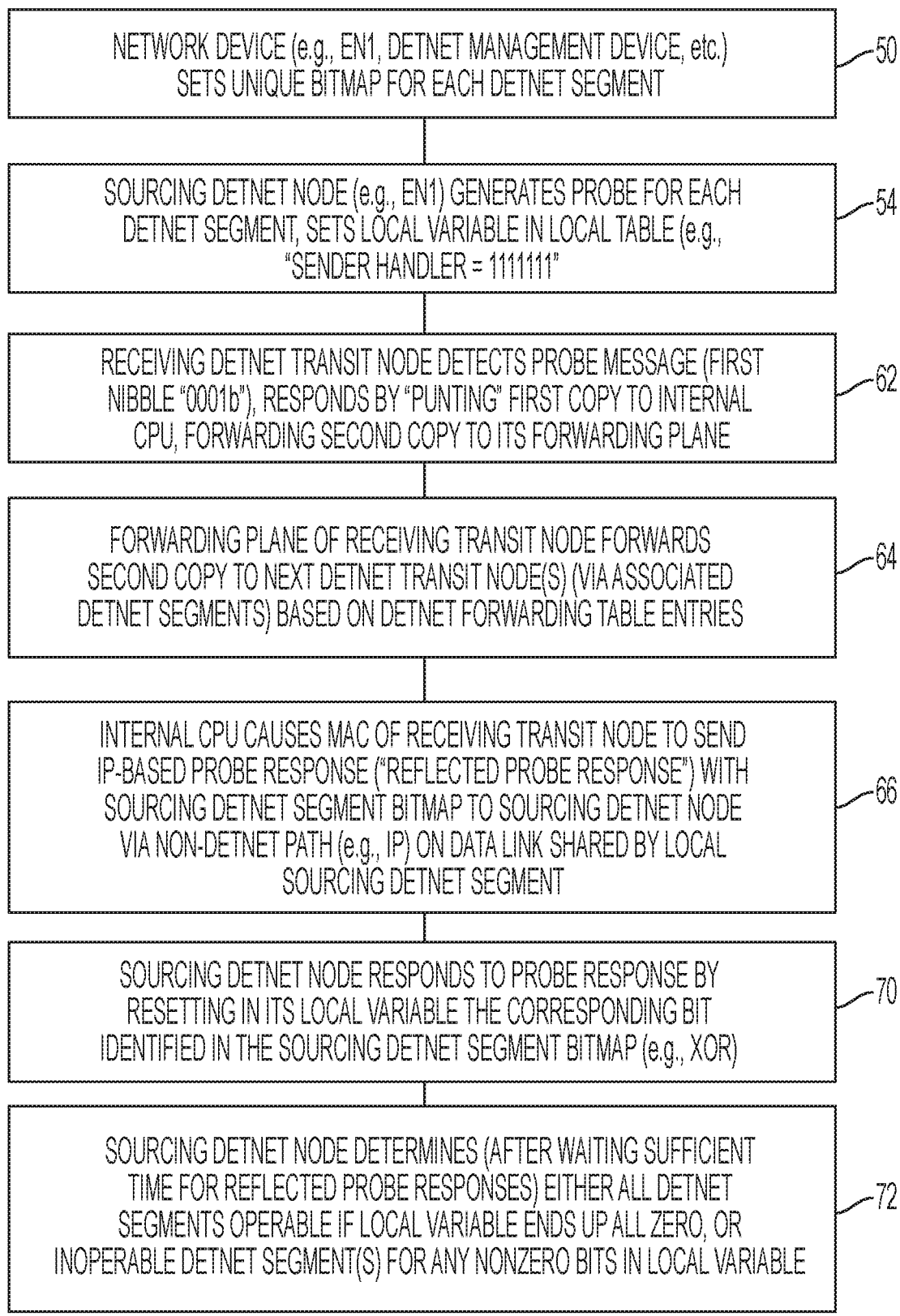
FIGS. 3A-3C summarize example methods for causing execution of distributed validation of DetNet operations executed in FIGS. 1A-1F, according to an example embodiment.

FIG. 3A illustrates an example method for causing a DetNet ingress device EN1 to initiate execution of distributed end-to-end validation of all the DetNet devices 18, according to an example embodiment. The network device (e.g., the ingress node EN1, the DetNet controller device 20, etc.) in operation 50 can set the above-identified unique bitmap for each corresponding DetNet segment, for example based on out-of-band signaling.

As illustrated in FIG. 1B, processor circuit (e.g., CPU) (52 of FIG. 12) of the ingress node EN1 16 can initiate validation of the DetNet path to EN2 based on generating and outputting in operation 54 of FIG. 3A an OOB d-OAM probe message 28 (specifying "0001" (binary) in the DetNet control word identifier 36 of the d-ACH 26) for each of the DetNet segments. In particular, EN1 can create a local variable "Sender_handler=1111111" 54 in a local table 56 (stored in a memory circuit 58 of FIG. 12) with all the seven bits set, and will insert the same bitstring "1111111" into the bitstring identifier value field 32a; EN1 also can insert its own node-specific details (e.g., node_id, timestamp, iOAM header, etc.) in the d-ACH 26 of each OOB d-OAM probe message 28, and also include an S-label 42. EN1 can forward the d-OAM probe message 28 along a DetNet track based on its forwarding table. Hence, EN1 can replicate the d-OAM probe message 28 and forward one copy towards DN2 via DetNet track "0000001" and another copy towards DN4 via DetNet track "0000010".

The device interface circuit (60 of FIG. 12) of each DetNet-capable transit node includes a DetNet forwarding hardware circuitry 38 that is configured for responding in operation 62 of FIG. 3A to detecting a d-OAM probe message (based on the first nibble specifying "0001b") 28 by "punting" a copy of the d-OAM probe message 28 to its local CPU (i.e., processor circuit) 52. In contrast to prior approaches that executed "punting" by pre-programming a media access controller (MAC) circuitry 164 (e.g., Ethernet/IP transceiver) in the device interface circuit 60 to intercept (and forward only to the CPU 52) a received (in-band) data packet (having a first nibble specifying "0000b") only in response to determining certain prescribed fields have values matching pre-programmed access control list (ACL) values, the example embodiments respond to a d-OAM probe message 28 (having a first nibble specifying "0001b") by generating two copies of the received d-OAM probe message 28, where one copy is "punted" to the CPU 52, and the second copy is forwarded (by the DetNet receiving plane executed in the DetNet forwarding hardware circuitry 38) to the DetNet forwarding plane executed in the DetNet forwarding hardware circuitry 38 of the DetNet capable transit node.

In particular, the DetNet forwarding hardware circuitry 38 of a DetNet device 16 is configured for punting if the first nibble of the d-OAM probe message 28 specifies "0001b", and if the DpV channel-type 30 is used, where the "semantic" of DpV channel-type+bitStringValue causes a DetNet device to "punt-and-terminate" the d-OAM probe message 28 if the corresponding bit of the supplying DetNet segment and the corresponding bit in the "bitStringValue" both equal "1".

Hence, DN2 and DN4 16 each can respond to receiving in operation 62 the d-OAM probe message 28 by punting one copy of the received d-OAM probe message 28 to its corresponding CPU (containing the d-ACH) 52. The DetNet forwarding hardware circuitry 38 of DN2, having received the d-OAM probe message 28, via EN1→DN2 allocated the bitstring ("0000001"), punts the d-OAM probe message 28 in response to detecting that the bitstring value "1111111" in the bitstring identifier value field 32a of the d-OAM probe message 28 matches the corresponding bit for the supplying DetNet segment ("0000001") (i.e., bitstring value "1111111" AND supplying DetNet segment ID "0000001"=1). Similarly, DetNet forwarding hardware circuitry 38 of DN4, having received the d-OAM probe message 28, via EN1→DN4 allocated the bitstring ("0000010"), punts the d-OAM probe message 28 in response to detecting that the bitstring value "1111111" in the bitstring identifier value field 32a of the d-OAM probe message 28 matches the corresponding bit for the supplying DetNet segment ("0000010") (i.e., bitstring value "1111111" AND supplying DetNet segment ID "0000010"=1).

The punted copy enables the corresponding CPU 52 to perform validation, however the CPU-based validation in operation 66 is referred to as a "slow" validation because its execution time is relatively slow compared to the execution speeds of the DetNet forwarding hardware circuitry 38 executing the DetNet forwarding plane; for example, the DetNet forwarding hardware circuitry 38 can be implemented as a dedicated ASIC configured for executing the DetNet forwarding plane, providing optimized execution speeds for the DetNet requirements. Hence, the relative delay in waiting for the CPU 52 to respond to the validation and return the d-OAM probe message 28 to the forwarding plane for further forwarding along the DetNet path to other DetNet-capable devices can result in unacceptably-long delays.

Hence, according to an example embodiment, each DetNet-capable transit node 16 also is configured for forwarding in operation 64 a second copy of the d-OAM probe message 28 (in the DetNet forwarding plane executed by the DetNet forwarding hardware circuitry 38) based on its corresponding forwarding table stored in its DetNet forwarding hardware circuitry 38: each DetNet-capable transit node 16 can include in its DetNet forwarding hardware circuitry 38 a forwarding table entry configured for forwarding the d-OAM probe message 28 to the next DetNet-capable device 16.

Figure 1C:
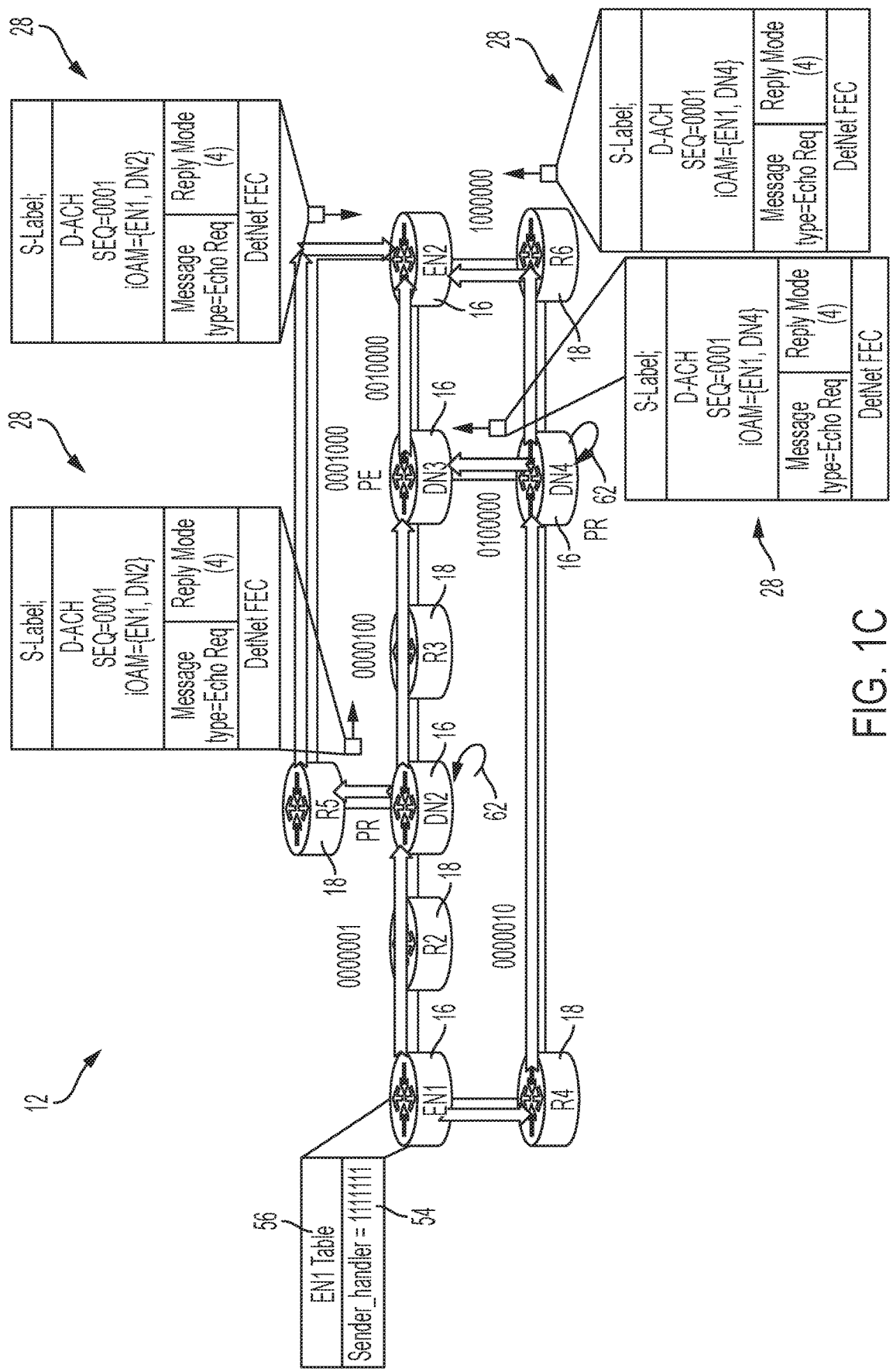

As illustrated in FIG. 1C, the DetNet forwarding hardware circuitry 38 (executing the DetNet forwarding plane) of DN2 can forward the second copy of the d-OAM probe message 28 in operation 64 to EN2 (via DetNet segment "0001000") and DN3 (via DetNet segment "0000100") based on its corresponding forwarding table entry, and the DetNet forwarding hardware circuitry 38 of DN4 (executing the DetNet forwarding lane) can forward the second copy of the d-OAM probe message 28 in operation 64 to EN2 (via DetNet segment "1000000") and DN3 (via DetNet segment "0100000") based on its corresponding forwarding table entry. Consequently the received d-OAM probe message 28 and the second copy of the d-OAM probe message 28 stay within the DetNet forwarding plane (including DetNet queuing, etc.), bypassing all other networking queues (e.g., IP-based, time-based, etc.) that would otherwise delay transmission of the second copy of the d-OAM probe message 28 (e.g., preventing an IP-based ping response message in an IP-based queue from interfering with transmission of the second copy of the d-OAM probe message 28 in the DetNet forwarding plane).

Figure 1D:
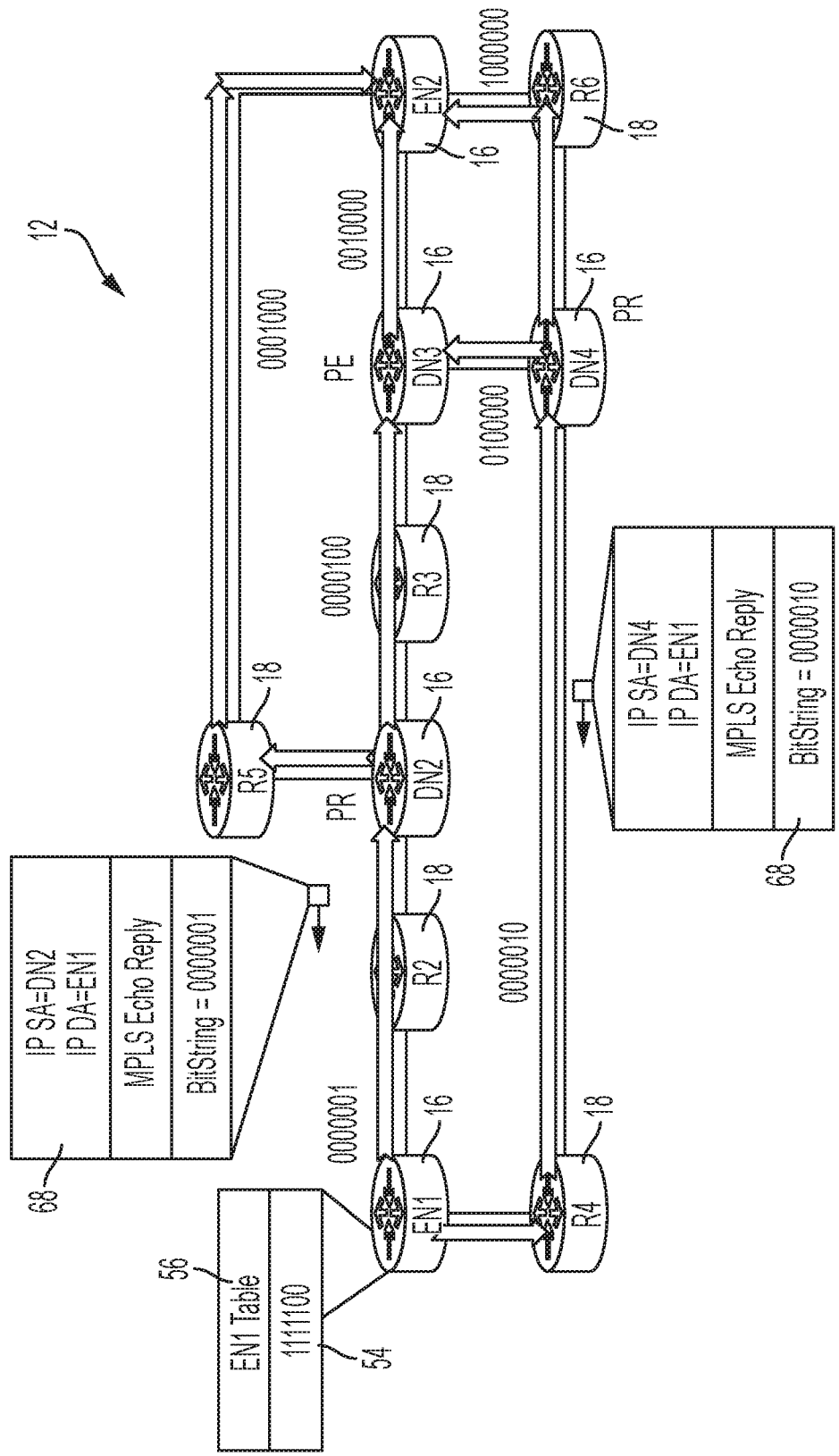

The CPU 52 of each DetNet-capable node DN2 and DN4 16 is configured for responding to the punted d-OAM probe message 28 (received from the corresponding DetNet forwarding hardware circuitry 38) specifying the "DpV" validation identifier 30 in operation 66 of FIG. 3A by generating and outputting an IP-based probe response 68 (i.e., "reflected probe message"), illustrated in FIG. 1D, to the sourcing device EN1 via a non-DetNet path (e.g., an IP-based connection sharing the same data link as the sourcing DetNet segment).

As illustrated in FIG. 1D, the CPU 52 of DN2 can generate and output (via R2) the probe response 68 specifying DN2 as the IP Source address, EN1 as the IP Destination address, the message type an "MPLS Echo Reply"; the CPU 52 of DN2 also can insert the corresponding bitstring identifier of the sourcing DetNet segment "0000001". The CPU 52 of DN4 can generate and output the probe response 68 specifying DN4 as the IP Source address, EN1 as the IP Destination address, the message type an "MPLS Echo Reply"; the CPU 52 of DN4 also can insert the corresponding bitstring identifier of the sourcing DetNet segment "0000010".

As illustrated in FIG. 1D, the sourcing DetNet device EN1 in operation 70 of FIG. 3A can respond to reception of the probe response 68 from DN2 by detecting that probe response 68 specifies the bitstring identifier "0000001, and in response the DetNet device can reset the corresponding bit its local variable (e.g., an Exclusive OR operation) resulting in "Sender Handler=1111110". Similarly, in response to the souring DetNet device EN1 receiving a probe response 68 from the DetNet device DN4 (specifying the bitstring identifier "0000010"), the souring DetNet device EN1 can reset its local variable 54 in its local table 56 from "Sender Handler=1111110" to "Sender Handler=1111100" as shown in FIG. 1D.

As shown in FIG. 1C, the DetNet forwarding hardware circuitry 38 of the DetNet device DN3 in operation 62 receives two copies of the d-OAM probe message 28 (one from DN2, one from DN4 as shown in FIG. 1C). The DetNet forwarding hardware circuitry 38 of DN3 in operation 64 can execute elimination of the duplicate copy of the d-OAM probe message 28, and can forward a single copy of the d-OAM probe message 28 to the egress node EN2 16 via the DetNet segment "0010000". The DetNet forwarding hardware circuitry 38 of DN3 also can respond to the two copies of the d-OAM probe message 28 by punting in operation 62 the two copies (one from DN2 and other from DN4) to CPU 52 in response to the DetNet control word identifier 36 and in response to determining the specified bitstring in the bitstring identifier value field 32a ("1111111") has the corresponding bit for incoming segments "0000100" (from DN2) and "0100000" (from DN4).

Figure 1E:
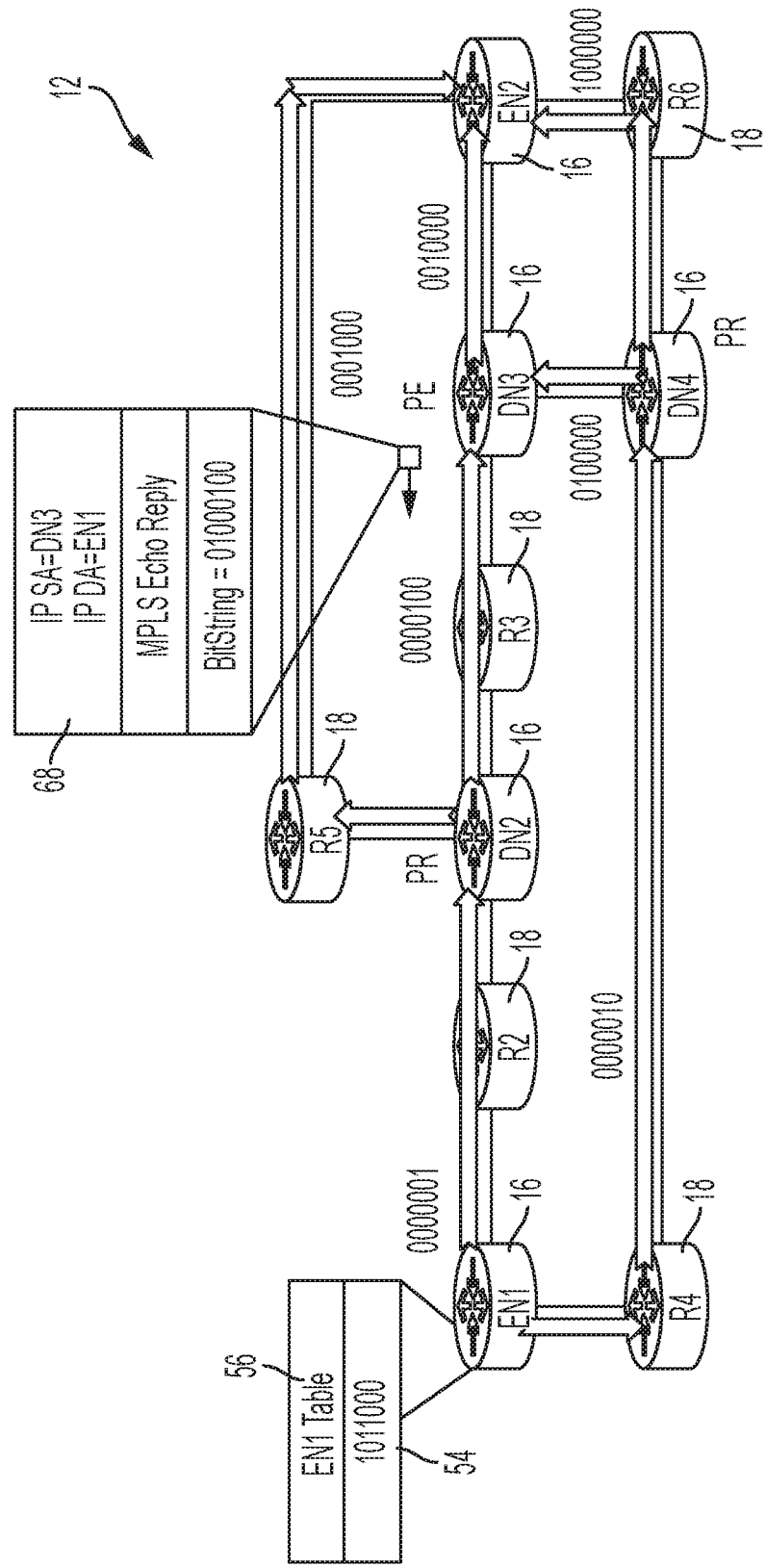

As illustrated in FIG. 1E, the CPU 52 of DN3 in operation 66 will respond to the d-OAM probe message 28 specifying the "DpV" validation identifier 30 by generating and outputting to EN1 a probe response 68 (specifying a bitstring "0100100" as an OR of the incoming segments "0000100" from DN2 and "0100000" from DN4). The initiator EN1 upon receiving the probe response 68 will reset in operation 70 the local variable 54 to "1011000".

Figure 1F:
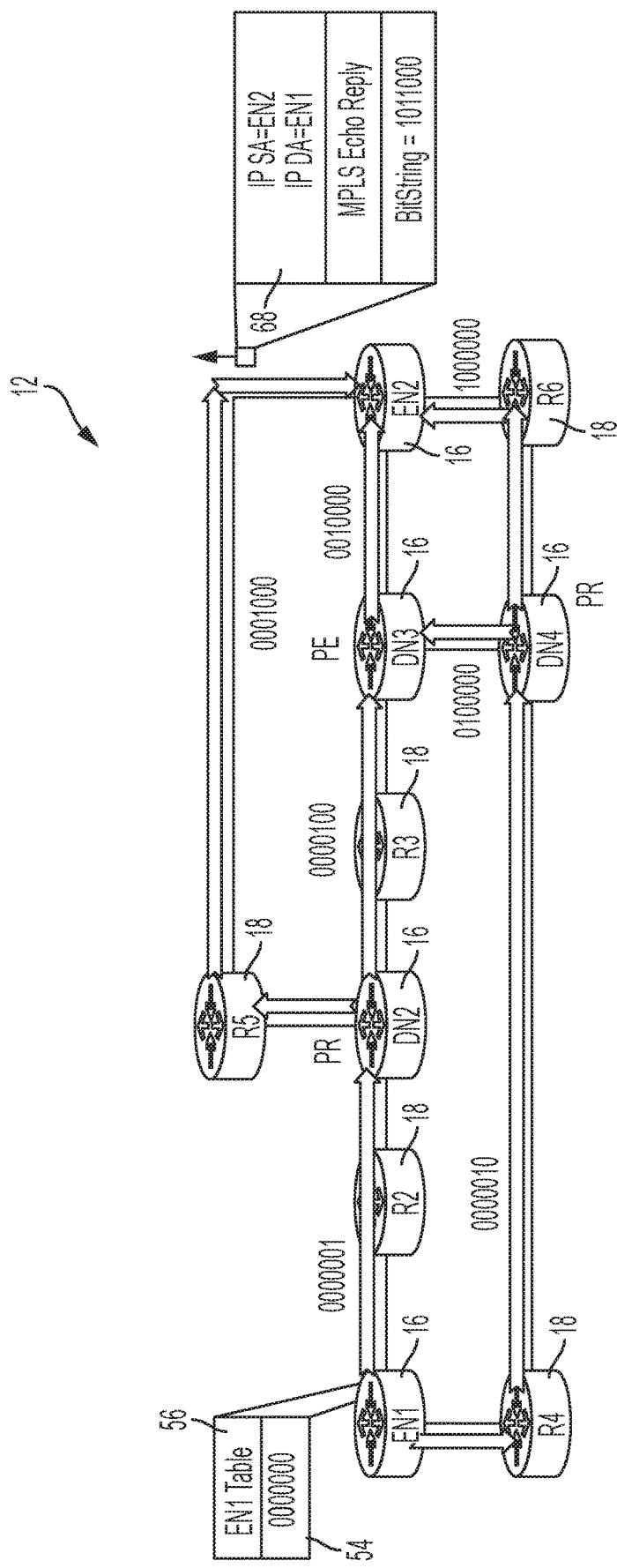

The DetNet forwarding hardware circuitry 38 of DetNet device EN2 in operation 62 receives three copies of the d-OAM probe message 28 from DN2 (via Segment "0001000"), DN3 (via Segment "0010000") and DN4 (via Segment "1000000"). Hence, the DetNet forwarding hardware circuitry 38 as DetNet egress terminates the three copies of the d-OAM probe message 28 and punts in operation 62 the three copies to its CPU 52, causing the CPU 52 in operation 66 to generate a probe response 68 specifying an aggregated bitmap "1011000" based on receiving the three copies of the d-OAM probe message 28 via the segments "0001000", "0010000" and "1000000". Hence, the CPU 52 of EN2 will reply back to Initiator EN1 with a probe response 68 specifying an aggregated bitstring of "1011000", illustrated in FIG. 1F, causing the Initiator EN1 to reset its local variable "Sender_handler" 54 to all-zero.

Hence, if in operation 72 of FIG. 3A the sourcing DetNet device EN1 receives probe responses 68 from all the DetNet devices 16, the resulting local variable 54 will be reset to "Sender Handler=0000000", indicating that all the DetNet segments are operating properly. Any remaining nonzero bits in the local value "Sender Handler" (after an adequate time for the DetNet devices to send reflected probe messages) can identify to the sourcing DetNet device EN1 one or more failing DetNet segments.

Figure 3B:
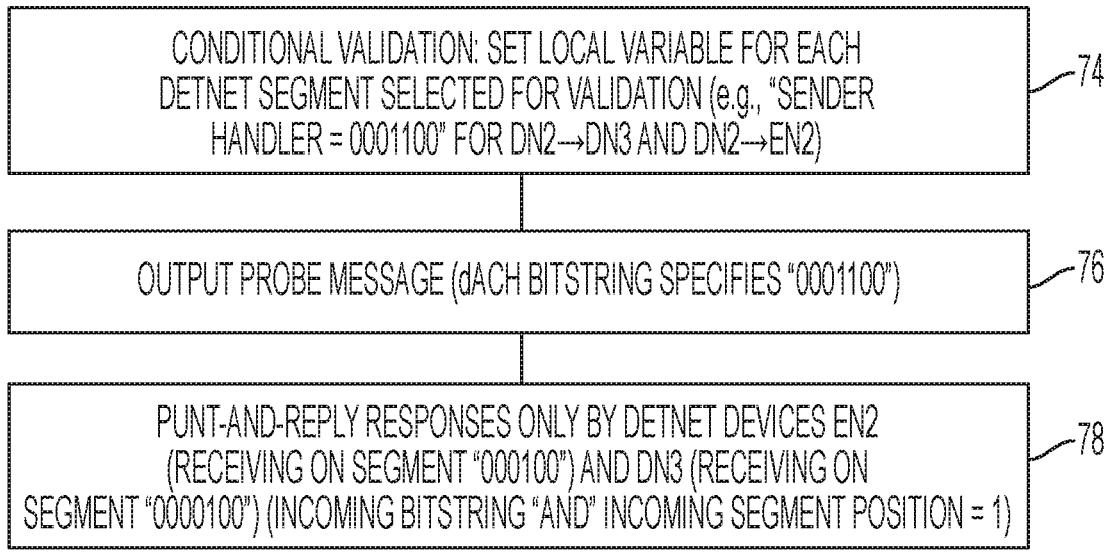
Figure 4:
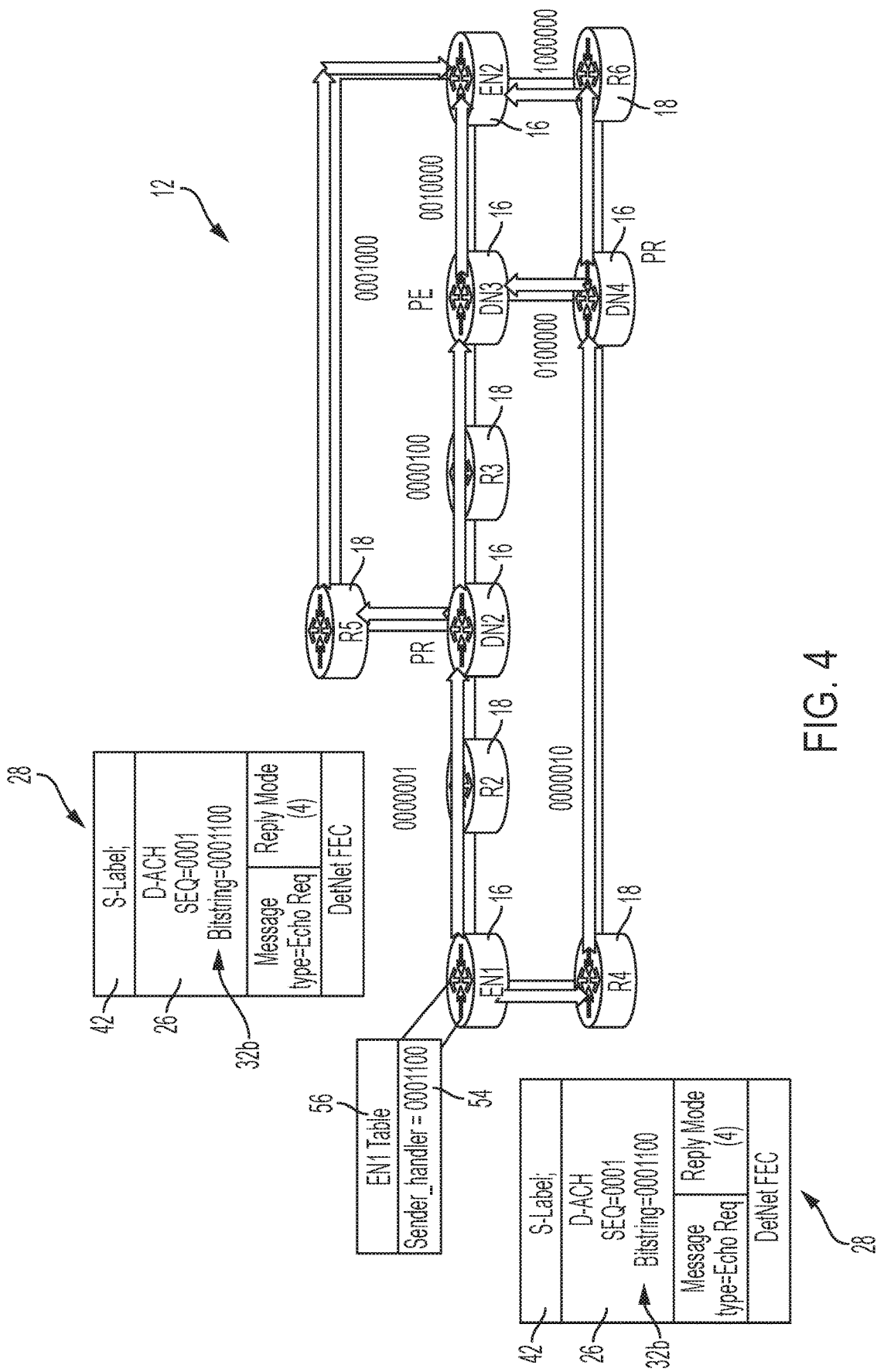
FIG. 4 illustrates an example conditional validation of DetNet operations executed by a DetNet forwarding hardware circuit using a DetNet-compliant OAM probe message specifying a validation identifier and a selected bitstring identifying selected DetNet segments, according to an example embodiment.

FIGS. 3B and 4 illustrate another example embodiment that can be used for conditionally validating selected segments. While the above-described example assumes all the DetNet nodes will be punting a copy of a received d-OAM probe message 28 and sending a probe response 68 to the initiator, a bitstring 32b can be used in a d-ACH 26 to control the punt behavior and the response 68, enabling validation of specific selected segments without consuming CPU resources on all the DetNet nodes. For example, insertion of the bitstring into the d-ACH 26 can cause a DetNet device to selectively punt if the DetNet device detects a local match.

For example, assume the initiator EN1 16 wants to specifically validate the replication functionality of the DetNet device DN2 onto the DetNet segments DN2→DN3 and DN2→EN2. The DetNet device DN2 is expected to replicate the a DetNet packet to DN3 and EN2: in order to validate the replicate function on DN2, the initiator EN1 can set in operation 74 the local variable 54 to "Sender_handler=0001100" (comprising the bit position for the segments from DN2→DN3 and DN2→EN2), and output in operation 76 a d-OAM probe message 28 including a d-ACH bitstring 32b specifying the same local variable value of "0001100".

Hence, each DetNet device 16 can be configured to punt in operation 78 a copy of a received d-OAM probe message 28 to its CPU 52 only if the corresponding bit of the incoming bitstring 32a is set, i.e., only if the AND operation of {"incoming_bitstring" AND "incoming segment bitposition"} results in a "1" value; if the AND operation results in a "0" value, the DetNet device 16 is configured to forwarding the received d-OAM probe message 28 in the forwarding plane (as previously described) without punting. Hence, in the above example, the DetNet forwarding hardware circuitry 38 of only the DetNet devices DN3 and EN2 will respond in operation 78 to the d-ACH bitstring value "0001100" by punting the copy of the received d-OAM probe message 28 from DN2, causing the corresponding CPU 52 to reply to the initiator EN1 16 without the d-ACH bitstring. The conditional validation is particularly effective in evaluating wireless links that are encountering flapping that can disrupt the reliability of a DetNet segment.

Figure 3C:
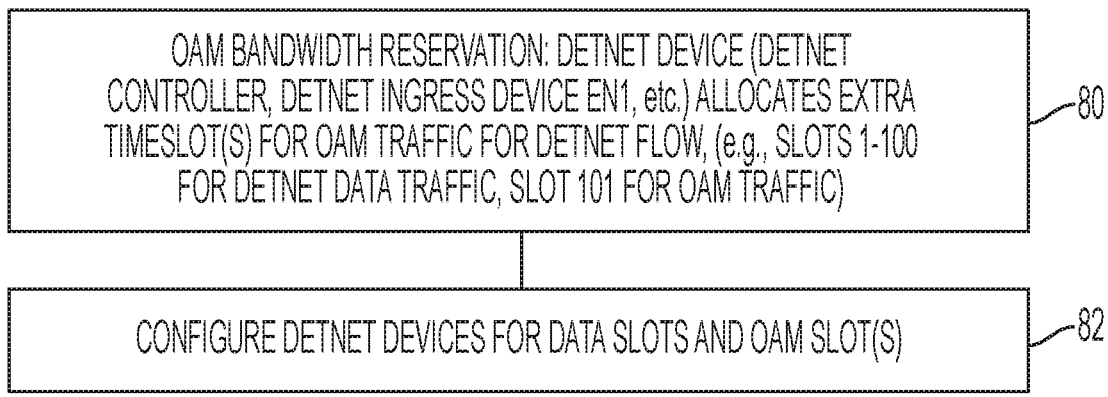

FIG. 3C illustrates example embodiment provides OAM bandwidth allocation, where a the processor circuit 52 of a network device (e.g., a DetNet controller 20, a DetNet ingress device EN1 16, etc.) is configured to allocate additional bandwidth exclusively for an OAM probe, as opposed to forcing transmission of an OAM probe within existing bandwidth allocated for DetNet data traffic (possibly resulting in choking the bandwidth allocated for the DetNet data traffic). Hence, the initial DetNet bandwidth is designed with OAM rate consideration, and the end systems (e.g., DetNet devices sending OAM messages or OAM responses such as reflected-OAM probes) will be instructed to use the relevant timeslot.

For example, if a DetNet data flow requires one hundred (100) timeslots assign for DetNet data traffic, the processor circuit 52 of a controller (e.g., the DetNet controller device 20 and/or the EN1 16) can assign in operation 80 one hundred and one (101) timeslots for the DetNet data flow, where timeslots 1-100 are reserved exclusively for DetNet data traffic and timeslot 101 is for OAM traffic (including transmission of any d-OAM probe message 28). The details regarding transmission of OAM traffic on the relevant timeslot (e.g., timeslot 101) can be provisioned by the DetNet controller device 20 and/or the EN1 16 on the remaining DetNet devices 16, hence any OAM probe sent (e.g., 28) will be sent by a DetNet device 16 only during the relevant timeslot, preserving the timeslots 1-100 for the DetNet data traffic.

Hence, the above-described example embodiments provide a source-initiated, source-controlled, localized evaluation of one or more DetNet segments along a deterministic DetNet track, without interfering with bandwidth allocated for DetNet data traffic, where the "source" is an ingress DetNet node for a DetNet track that ends in an egress DetNet node.

One-Hop Self and Remote PREOF Validation Using a Bitstring Identifying DetNet Devices in an ACH of DetNet OAM FIGS. 5-11 illustrate example embodiments that provide a distributed evaluation that enables any DetNet node 16 to execute a self-evaluation based on the above-described d-ACH behaviors, as opposed to the above-described end-to-end evaluation of a DetNet track initiated by an ingress DetNet node of the DetNet track. Each DetNet node 16 can check to see if it is working properly, where the CPU 52 of the DetNet node can determine if its associated DetNet hardware circuitry 38 is operating properly in performing any DetNet packet replication, elimination, and/or ordering functions (PREOF).

Figure 5:
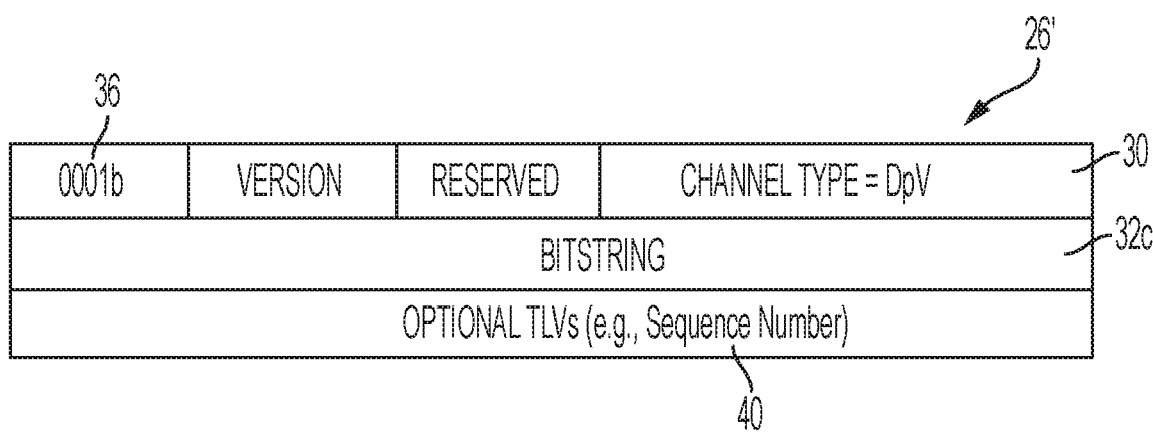
FIG. 5 illustrates an example d-ACH for a d-OAM probe message specifying a validation identifier and a bitstring of selected DetNet devices for distributed validation of DetNet operations, according to an example embodiment.

FIG. 5 illustrates an example d-ACH 26' for a d-OAM probe message (e.g., 28' of FIG. 7) and specifying a validation identifier 30 and a bitstring 32c of selected DetNet devices for distributed validation of DetNet operations, according to an example embodiment.

Figure 6:
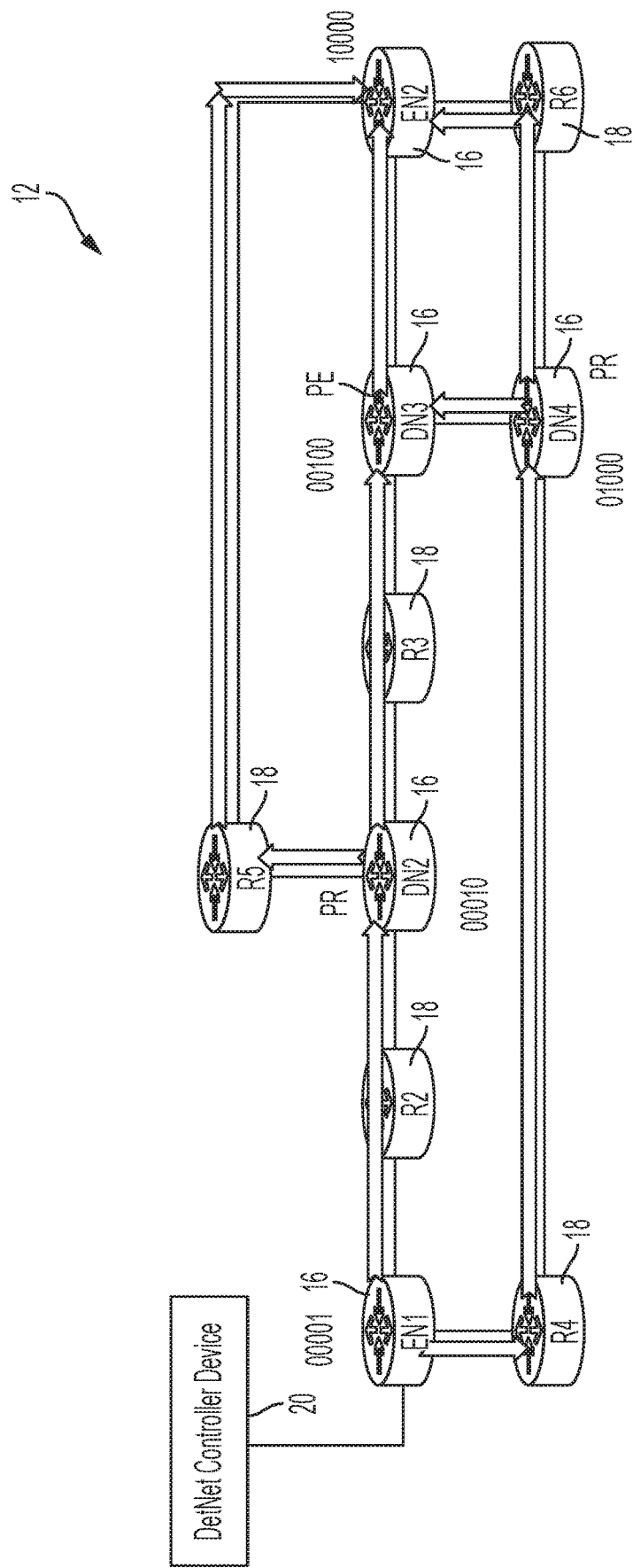
FIG. 6 illustrates an example system having an apparatus for causing execution of distributed validation of DetNet operations executed by a DetNet forwarding hardware circuit in a DetNet device of a DetNet network, using a DetNet-compliant OAM probe message specifying a validation identifier and a selected bitstring identifying selected DetNet devices, according to an example embodiment.

FIG. 6 illustrates bit position allocation based on a DetNet device 16 as opposed to a DetNet segment as previously described. The example embodiments of FIGS. 5-11 vary from the prior embodiments in that instead of allocating a unique bit position to a corresponding DetNet segment (e.g., EN1→DN2 (via R2)), a unique bit position instead is allocated to each DetNet node 16 for a given DetNet flow; in other words, the uniqueness of a bit position for a DetNet node only needs to be within the scope of the given DetNet flow.

Figure 8A:
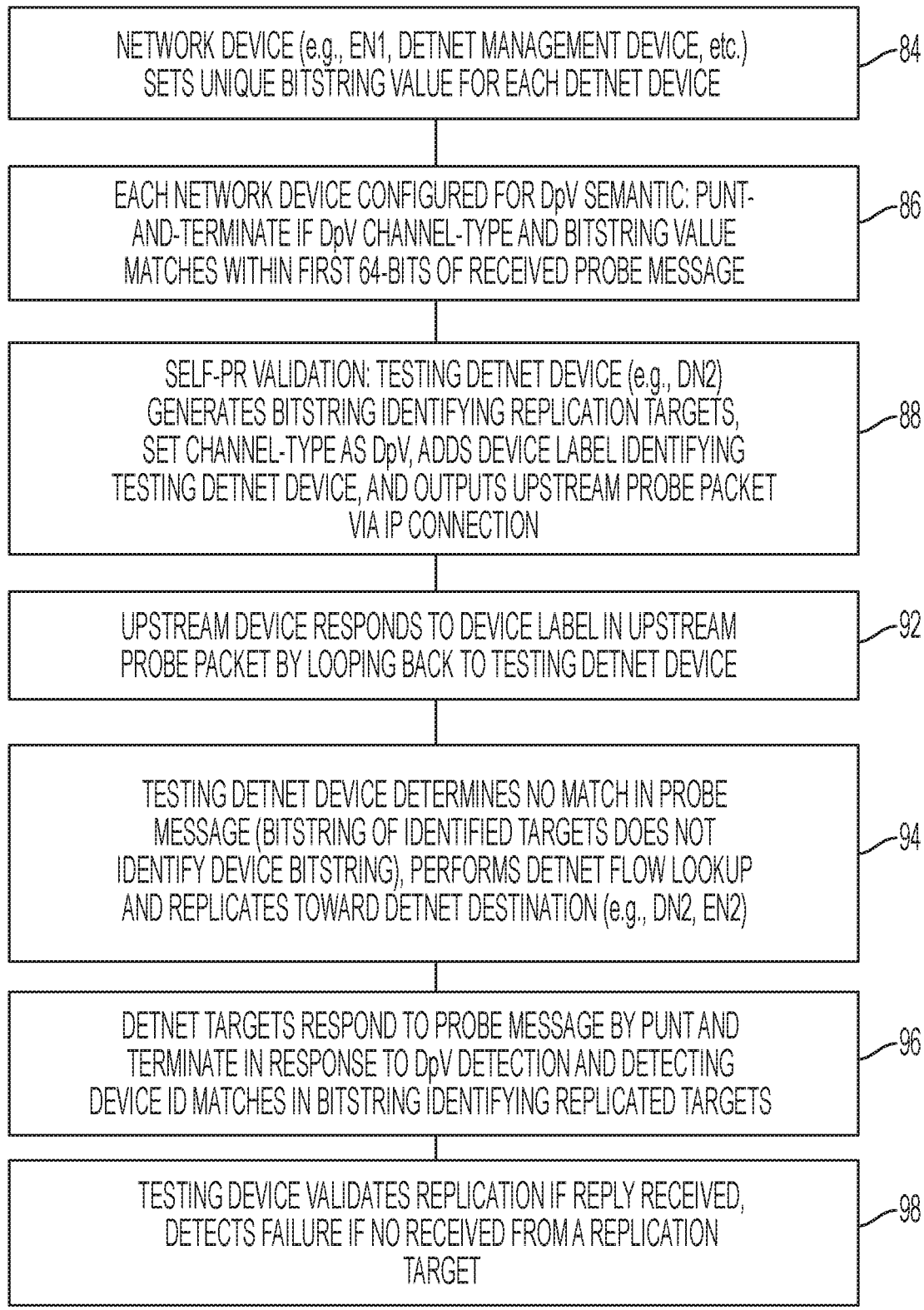
FIGS. 8A-8D summarize example methods for causing execution of self-initiated distributed validation DetNet operations using a DetNet-compliant OAM probe message specifying a validation identifier and a selected bitstring identifying selected DetNet devices, according to an example embodiment.

As illustrated in FIGS. 6 and 8A, for each DetNet path (flow based or aggregated path), each DetNet node is assigned in operation 84 (e.g., by a DetNet controller or any one of the DetNet devices) a unique bit position value: for example the DetNet node EN1 is assigned the unique bit position value "00001"; the DetNet node DN1 is assigned the unique bit position value "00010"; the DetNet node DN3 is assigned the unique bit position value "00100"; the DetNet node DN4 is assigned the unique bit position value "01000"; and the egress DetNet node EN2 is assigned the unique bit position value "10000". The uniqueness is required to be maintained only within the DetNet track for the given DetNet flow; uniqueness can be extended to an entire path for multiple DetNet flows (at the expense of requiring a larger bitstring), but permits use of fixed size bitstring in d-ACH; assignment of domain-wide unique position also increases the size of the bitstring to be carried in the DetNet ACH, but requires only one state entry on the DetNet.

The DetNet forwarding hardware circuitry 38 of DetNet device 16 is configured in operation 86 of FIG. 8A (e.g., by the DetNet controller device 20 and/or the EN1 16) for responding to the DpV channel-type 30, where the "semantic" of DpV channel-type+bitString Value causes a DetNet device to "punt-and-terminate" the d-OAM probe message 28. Each DetNet node parses the first 64 bits of the d-ACH 26' of FIG. 5 to identify whether to execute "punt-and-terminate" on the d-OAM probe message 28. For example, the DetNet device DN2 is assigned the bit position of "2" (i.e., the unique bit position value "00010"), hence the DetNet device DN2 would generate the following 64-bit control word value:

{[0001][Version][00000000][ChannelType][000 . . . 010]}

Hence, the DetNet device DN2 can match the first 64 bits of the d-ACH 26' of FIG. 5 from the received packet to perform and "AND" operation with above value. If it results in True, the DetNet device DN2 can execute the "punt-and-terminate" action.

Figure 7:
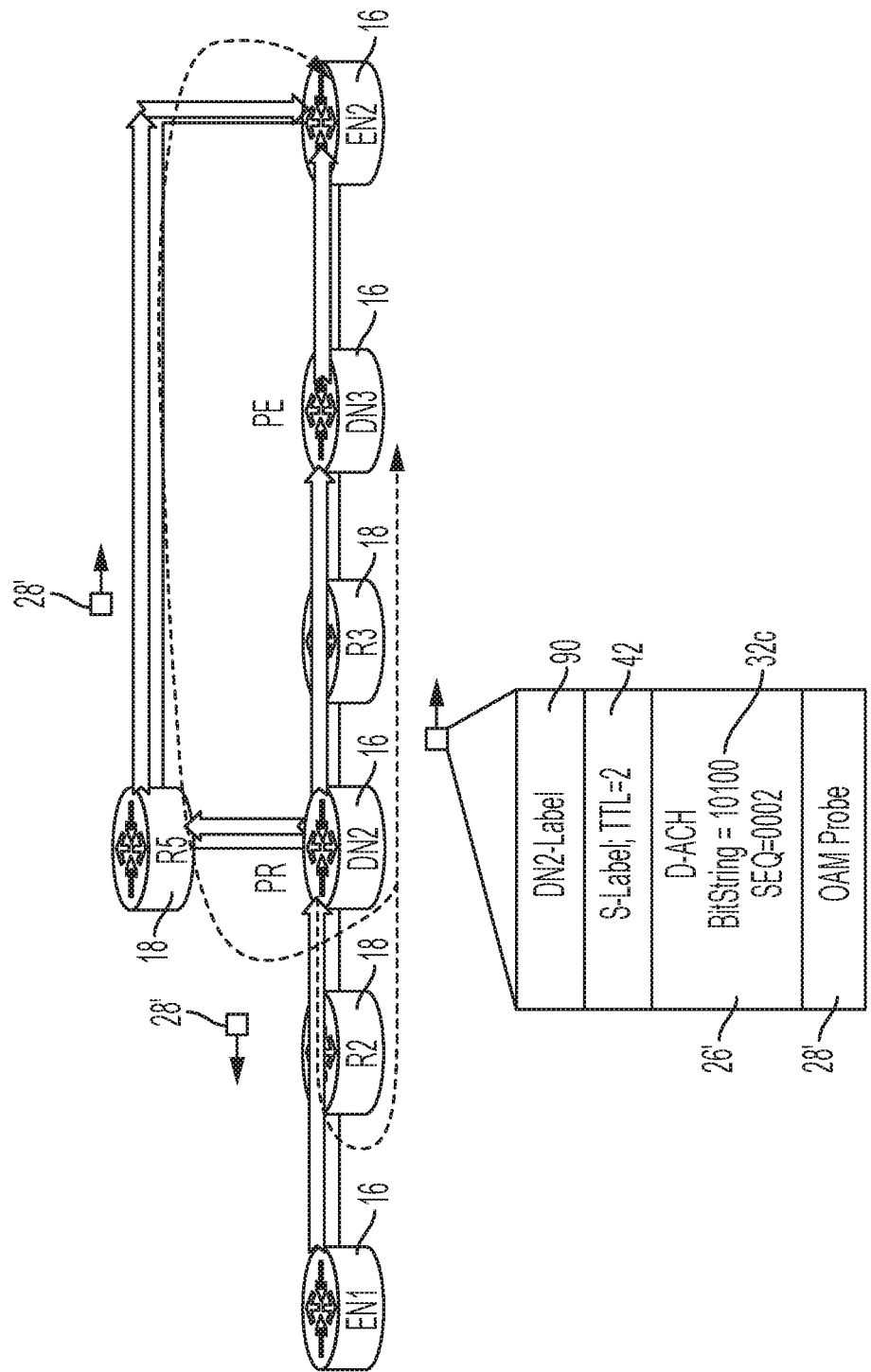
FIG. 7 illustrates self-initiated distributed validation of packet replication by a DetNet device in the DetNet network of FIG. 6, according to an example embodiment.

As illustrated in FIG. 7, this embodiment provides the advantage that a DetNet device (e.g., DN2) can generate a d-OAM probe message 28', send the d-OAM probe message 28' to an upstream device (e.g., R2 18) that loops the d-OAM probe message 28' back to the originating DetNet device (DN2) 16, enabling the originating DetNet device (DN2) 16 to execute the "punt-and-terminate" action on its own d-OAM probe message 28'. Hence, the CPU 52 of the DetNet device (DN2) can validate whether its associated DetNet forwarding hardware circuitry 38 is operating properly based on reception of the punted d-OAM probe message 28': in other words, the DetNet CPU 52 is incapable of determining on its own whether its associated DetNet forwarding hardware circuitry 38 is operating properly, since the DetNet forwarding hardware circuitry 38 operates on its own at a much faster rate than the processing operations of the corresponding CPU 52; hence, the punted d-OAM probe message 28' enables a CPU 52 to confirm that its DetNet forwarding hardware circuitry 38 is operating properly.

The example embodiments provide two types of PREOF validation, namely self PREOF validation, and NextHop PREOF validation.

FIGS. 7 and 8A illustrate an example of self PREOF validation, in particular self packet replication (PR) validation. In self PREOF validation, each DetNet node 16 can validate the local PR functions and upon detecting any failure, it will log an error message in a prescribed data structure, enabling a controller device and/or network operator to react to the logged error message.

For example, in FIGS. 7 and 8A, the control plane executed in the testing DetNet device DN2 (e.g., by the processor circuit 52) can execute self packet replication (PR) validation based on configuring the forwarding DetNet hardware circuitry 38 (e.g., based on adding a forwarding table entry in the DetNet forwarding hardware circuitry 38) to replicate a DetNet flow packet to DN3 (allocated bitstring "00100") and EN2 (allocated bitstring "10000"). Accordingly, the DetNet device DN2 generates in operation 88 the bitmap bitstring 32c identifying the replicated targets DN3 (as "00100") and EN2 (as "10000"), and inserts into the d-ACH 26' for validation the aggregated bitstring "10100" of the replicated targets DN3 and EN2 (i.e., an "OR" operation of the respective bitstrings "00100" and "10000" for the DetNet devices DN3 and EN2).

The processor circuit executing the control plane in the processor circuit 52 of the testing DetNet device DN2 can generate the d-OAM probe message 28' and set the channel-type as "DpV" 30, insert the bitstring as "10100" 32c, append with an MPLS label 90 specifying "DN2" and a DetNet S-label 42 and forward the d-OAM probe message 28' upstream of the DetNet flow direction towards non-DetNet device R2 18.

The non-DetNet device R2 18 can respond to the received d-OAM probe message 28' by detecting from the MPLS label 90 that the d-OAM probe message 28' is destined for the device DN2, hence the non-DetNet device R2 18 in operation 92 can respond to the DN2-label by forwarding back ("loop-back") the d-OAM probe message 28' to DN2.

The DetNet forwarding hardware circuitry 38 of the testing DetNet device DN2 responds to receiving the d-OAM probe message 28' from R2 18 by determining the DetNet track from the S-label 42, and applying the appropriate semantics and forwarding behavior for the identified DetNet track. Hence, the DetNet forwarding hardware circuitry 38 of the DetNet device DN2 can execute the semantics for the identified DetNet track, including determining in operation 94 the bitstring value "10100" specified in the bitstring identifier value field 32c does not match with its own device ID "00010", hence, the DetNet forwarding hardware circuitry 38 of the DetNet device DN2 does not perform punt or terminate, and the DetNet forwarding hardware circuitry 38 continues with performing in operation 94 DetNet flow lookup and replicating the d-OAM probe message 28' towards targets DN3 and EN2 of the identified DetNet track toward the DetNet destination (i.e., the destination host 24 via the DetNet egress (EN2).

EN2 and DN3 each can respond to receiving the d-OAM probe message 28' in operation 96 by determining its corresponding device ID matches in the bitstring identifying the replicated targets in the d-OAM probe message 28' (i.e., device ID AND target bitstring=device ID); hence, the targets E2 and DN3 of the replicated d-OAM probe message 28' each can punt and terminate by replying back to the d-OAM probe message 28 by sending the a reply (e.g., a probe response) back to the DetNet device DN2. In particular, the "punt" causes a the DetNet forwarding hardware circuitry 38 of each replicated target E2 and DN3 to forward the d-OAM probe message 28' to its corresponding CPU 52; the CPU 52 responds to the received d-OAM probe message 28' by generating the reply, and causing the MAC circuitry 164 in the device interface circuit 60 to send the reply to the initiator DetNet device DN2 via an IP-based connection on the same data link shared with the identified DetNet track.

Hence, the DetNet device DN2 can validate in operation 98 the replication operations for EN2 and DN3 based on the respective responses. Any failure will be detected by DN2 based on a missing response from a replication target. As apparent from the foregoing, the CPU 52 of the testing DetNet device DN2 can validate the replication operations of its DetNet forwarding hardware circuitry 38 based on the actions of the corresponding upstream network device (e.g., R2) and the replication targets DN3 and EN2, without any direct monitoring of the high-speed of the DetNet forwarding hardware circuitry 38 (since direct monitoring would be impossible by the slower CPU 52).

Figure 8B:
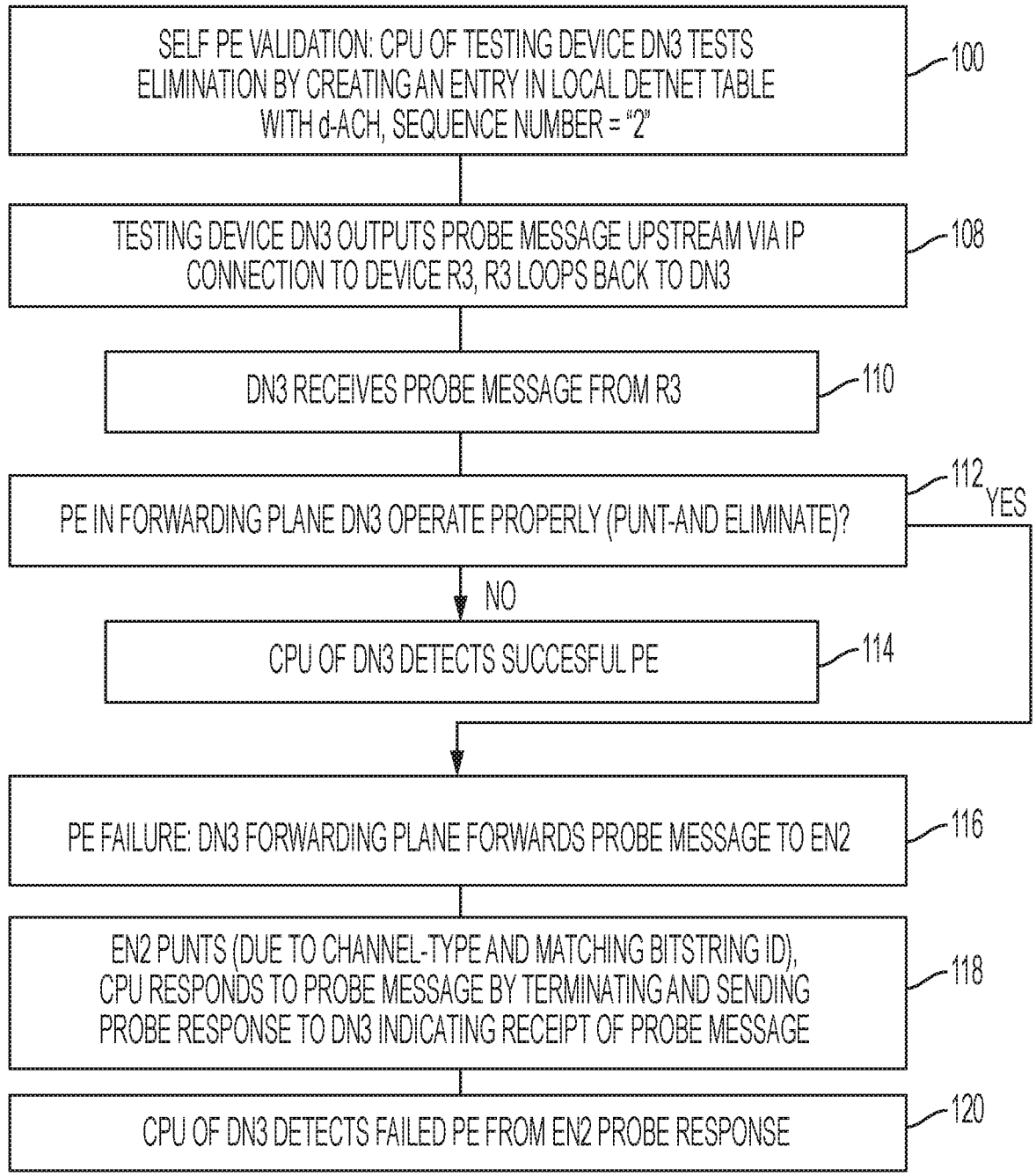
Figure 9:
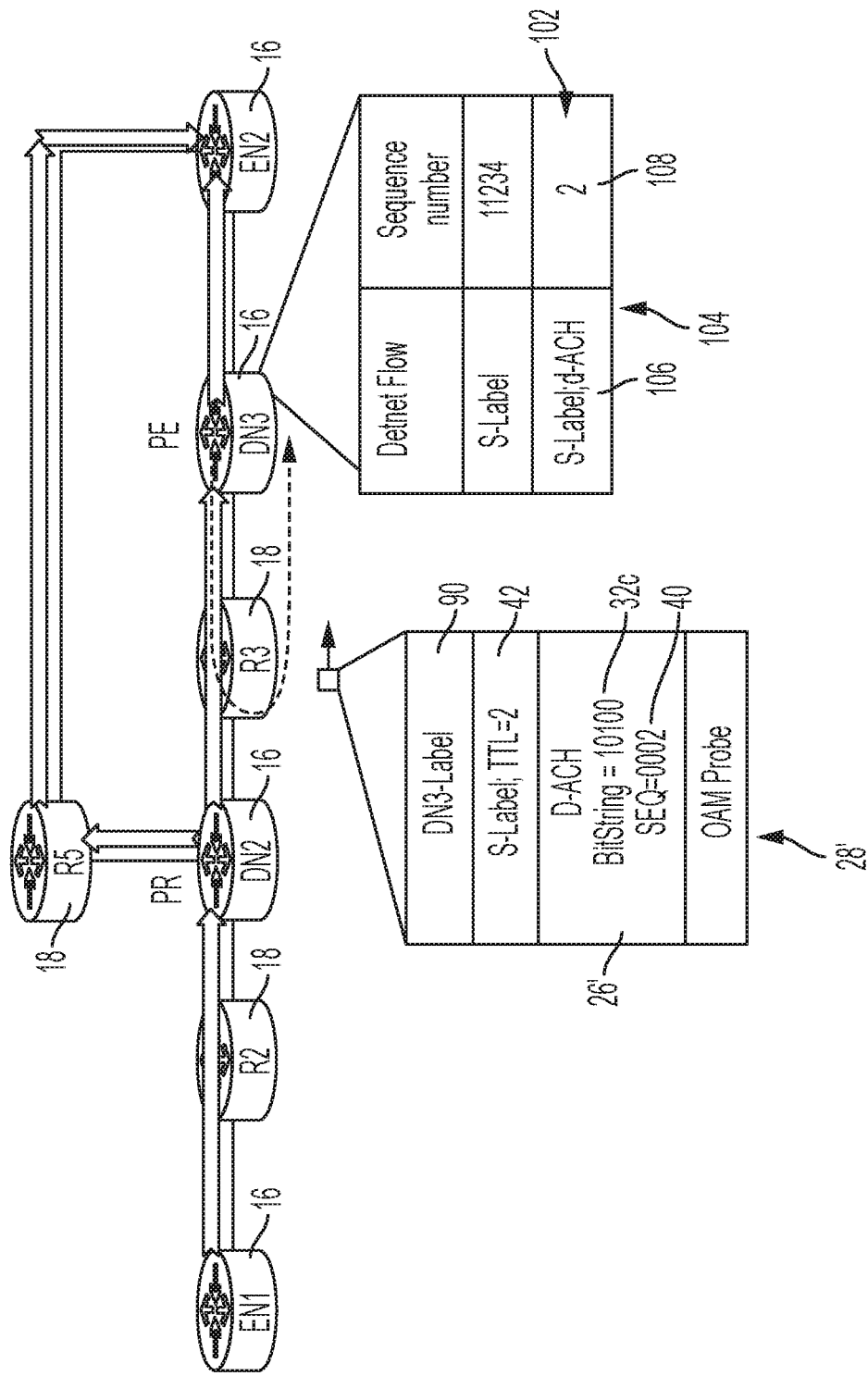
FIG. 9 illustrates self-initiated distributed validation of packet elimination by a DetNet device in the DetNet network of FIG. 6, according to an example embodiment.

FIGS. 8B and 9 illustrate self packet elimination (PE) validation, where a DetNet device forwards the first-received DetNet packet along the DetNet track and eliminates (i.e., drops) any duplicate copies received after the first-received DetNet packet, the duplicate copy identified by having the same Sequence Number. Referring to FIG. 8B, the processor circuit 52 of the DetNet Device DN3 determines the DetNet forwarding hardware circuitry 38 is expected to forward one copy of a DetNet packet to EN2 and eliminate any duplicates; for example, if in FIG. 6 the DetNet Device DN3 receives at time t1 a DetNet packet from the DetNet device DN2 (with Sequence Number "0100") and forwards the DetNet packet to DetNet device EN2, then if the same packet is received from "DN4" at time t2 the DetNet forwarding hardware circuitry 38 of the DetNet device DN3 is expected to eliminate the duplicate.

The CPU of the DetNet device DN3 can execute self PE validation, to ensure the local PE functionality is working properly in the forwarding plane hardware circuitry, based on the CPU of the DetNet device DN3 creating in operation 100 an entry 102 in the local DetNet OAM table 104 of the DetNet forwarding hardware circuitry 38 for the DetNet flow "S-Label" 106 with "d-ACH; Sequence-number" that represents a previously-received d-ACH packet. As shown in the FIG. 9 the CPU creates a sequence number 108 of "2"; hence, the local DetNet table entry 102 causes an expectation in the DetNet forwarding hardware circuitry 38 that it will not receive another copy of the d-OAM probe message 28.

The CPU 52 of DetNet device DN3 can generate a d-OAM probe message 28', illustrated in FIG. 9, with sequence number 40 set to 2. The bitstring 32c will be set to a value "10100" encompassing the bitstring identifier of DN3 "00100" and EN2 "10000" (in case the elimination fails and the d-OAM probe message 28' is sent to EN2, EN2 will punt and reply and enable DN3 to detect the failed elimination). The processor circuit 52 of DN3 causes the MAC circuitry 164 to output the d-OAM probe message 28' to device R3 in operation 108. The device R3 will respond to the d-OAM probe message 28' by forwarding it back to DetNet device DN3 in response to the MPLS label 90 specifying "DN3".

The DetNet forwarding hardware circuitry 38 of the DetNet device DN3, in response to receiving in operation 110 the d-OAM probe message 28' is expected to drop/eliminate the d-OAM probe message 28 due to the PE functionality executed in response to detecting the local DetNet table entry having a sequence number of "2" that matches the sequence number in the received d-OAM probe message 28. If PE functionality works properly in the DetNet forwarding hardware circuitry 38, the DetNet forwarding hardware circuitry 38 of the DN3 will drop the received d-OAM probe message 28' and trigger in operation 112 a self response (to its CPU 52) stating the packet is eliminated. Hence, the CPU 52 of the DetNet device DN3 can detect in operation 114 a successful elimination in operation 112 in response to receiving a self response.

If PE functionality is not working properly in the DetNet forwarding hardware circuitry 38 of DN3, the DetNet forwarding hardware circuitry 38 of DN3 will further forward in operation 116 the d-OAM probe message 28' to DetNet device EN2. The DetNet forwarding hardware circuitry 38 of DetNet device EN2 will punt in operation 118 to its CPU 52 due to the channel-type and the matching bitstring id, and the corresponding CPU 52 of EN2 will respond to the d-OAM probe message 28' by terminating the d-OAM probe message 28' and sending in operation 118 a probe response to the DetNet device DN3 indicating receipt of the d-OAM probe message 28'. Hence, the CPU 52 of the DetNet device DN3 can detect in operation 120 a failed elimination in response to receiving the probe response from DetNet device EN2.

A variation of the above-described self PE validation is that the CPU 52 of DetNet device DN3, instead of creating the table entry 102 as illustrated in FIG. 9, also can send two copies of the same d-OAM probe message 28' to the upstream device R3, causing the upstream device R3 to send both copies of the same d-OAM probe message 28' back to the DetNet device DN3, which causes the DetNet forwarding hardware circuitry 38 of DN3 to forward the first copy to DetNet device EN2 (causing DetNet device EN2 to punt due to the channel-type and the matching bitstring id and send a probe reply to DetNet device DN3), and which should cause the DetNet forwarding hardware circuitry 38 of DN3 to eliminate the second copy: hence, the CPU 52 DetNet device DN3 can detect a successful elimination in response to a single probe reply (for the first d-OAM probe message 28'), and a failure in response to a second probe reply from EN2 (indicating receipt of the second probe response that should have been eliminated).

Figure 8C:
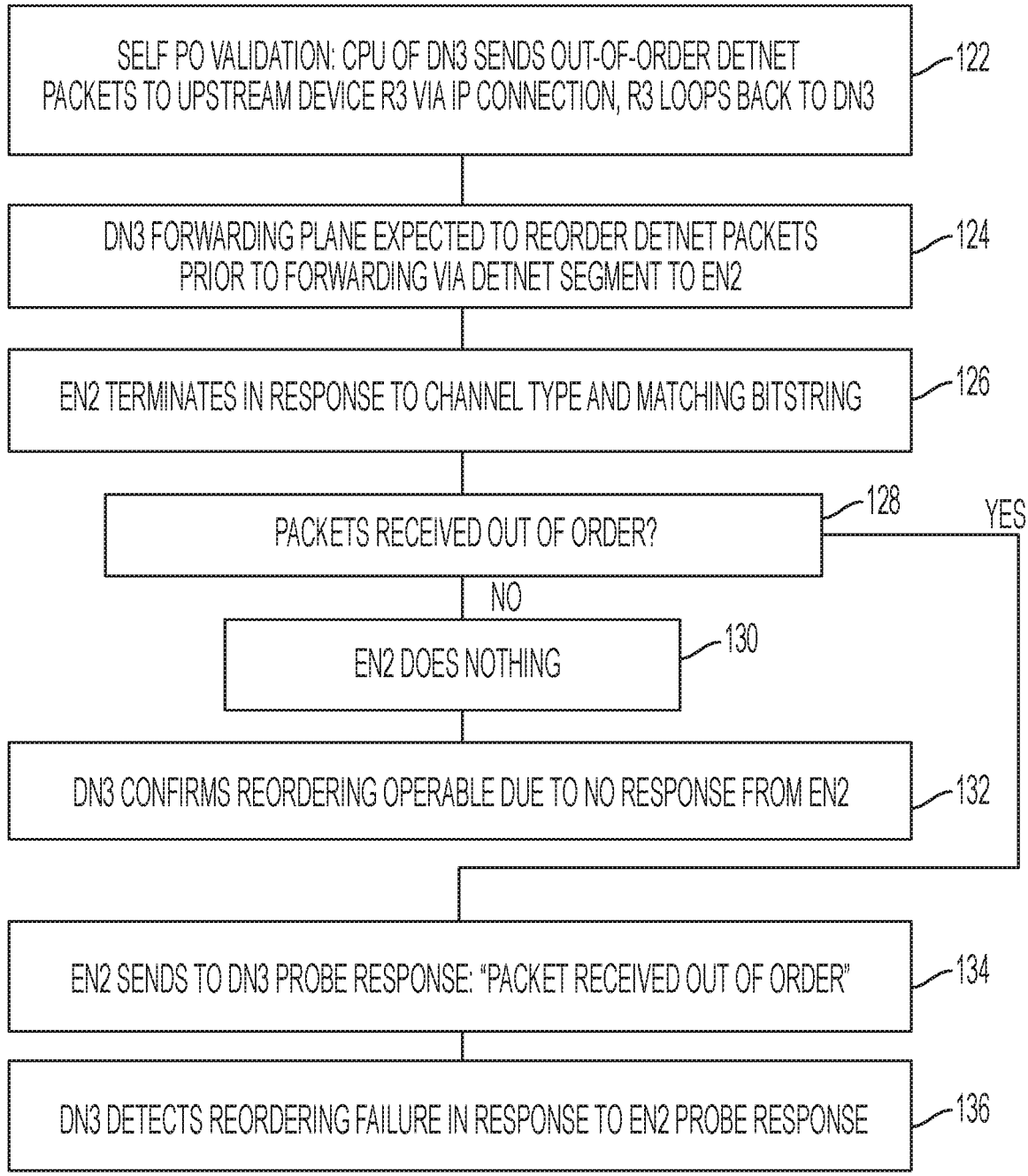
Figure 10:
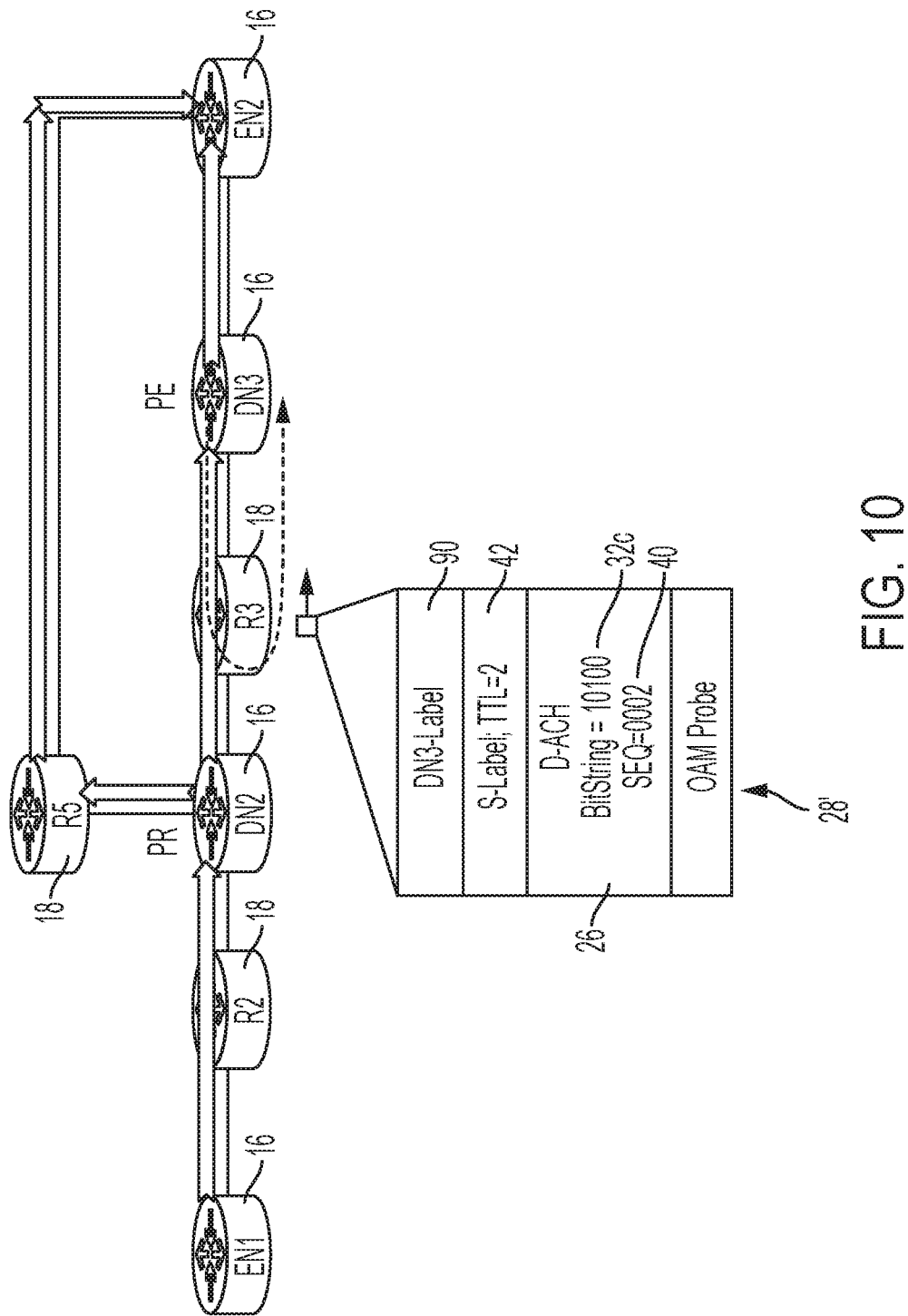
FIG. 10 illustrates self-initiated distributed validation of packet ordering by a DetNet device in the DetNet network of FIG. 6, according to an example embodiment.

FIGS. 8C and 10 illustrate packet reordering self-validation. As illustrated in FIGS. 8C and 10, the CPU 52 of DetNet device DN3 expects the DetNet forwarding hardware circuitry 38 to forward the DetNet packet to EN2. To ensure that the local packet ordering (PO) functionality is working fine, the CPU 52 of DetNet device DN3 will send out of order probe packets 28' upstream and check if the local PO functionality in the DetNet forwarding hardware circuitry 38 in DN3 is re-ordering the packet.

Hence, the CPU of DetNet device DN3 in operation 122 can generate d-OAM probe messages 28' as illustrated in FIG. 10 with out of order sequence numbers (e.g., first d-OAM probe message 28' specifies "SEQ=0002" while second d-OAM probe message 28' specifies "SEQ=0001"), insert the bitstring 32c as "101000" (for actions by DN3 and EN2) and forward in operation 122 the out-of-order d-OAM probe messages 28' towards device R3 18, which forwards the out-of-order d-OAM probe messages 28' back to DN3.

The DetNet forwarding hardware circuitry 38 of the DetNet Device DN3 in operation 124 is expected to re-order the d-OAM probe messages 28' before the DetNet forwarding hardware circuitry 38 forwards the (reordered) d-OAM probe messages 28' to DetNet Device EN2. The DetNet Device EN2 in operation 126 can terminate the received d-OAM probe message 28' due to the channel-type and bitstring matching its own id. If in operation 128 the DetNet forwarding hardware circuitry 38 of the DetNet Device EN2 receives the d-OAM probe messages 28' in order, the DetNet forwarding hardware circuitry 38 does nothing in operation 130, enabling the processor circuit 52 of DN3 to confirm in operation 132 reordering is operable in the DetNet forwarding hardware circuitry 38 due a determined absence of any response from EN 2 within a prescribed time interval.

However if in operation 128 the DetNet forwarding hardware circuitry 38 of EN2 receives the d-OAM probe messages 28' out of order, the DetNet forwarding hardware circuitry 38 of EN2 will send a response to its CPU 50 specifying "Packet received out-of-order", causing the CPU 50 of EN2 to send in operation 134 a probe response that the d-OAM probe messages 28' were received out of order. Hence, the CPU 50 of DN3 in operation 136 can detect the reordering failure of its DetNet forwarding hardware circuitry 38 in response to the EN2 probe response.

Figure 8D:
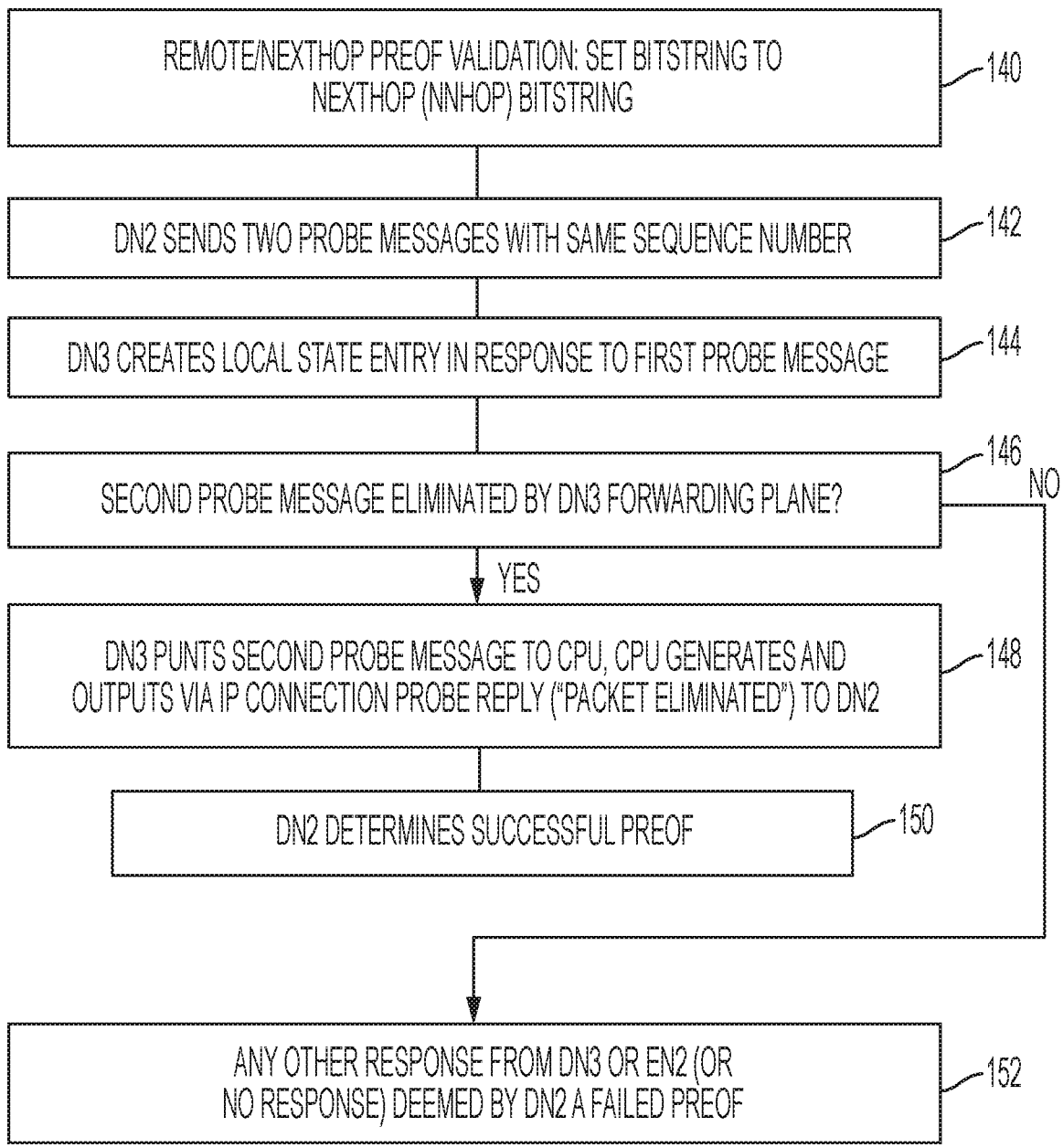
Figure 11:
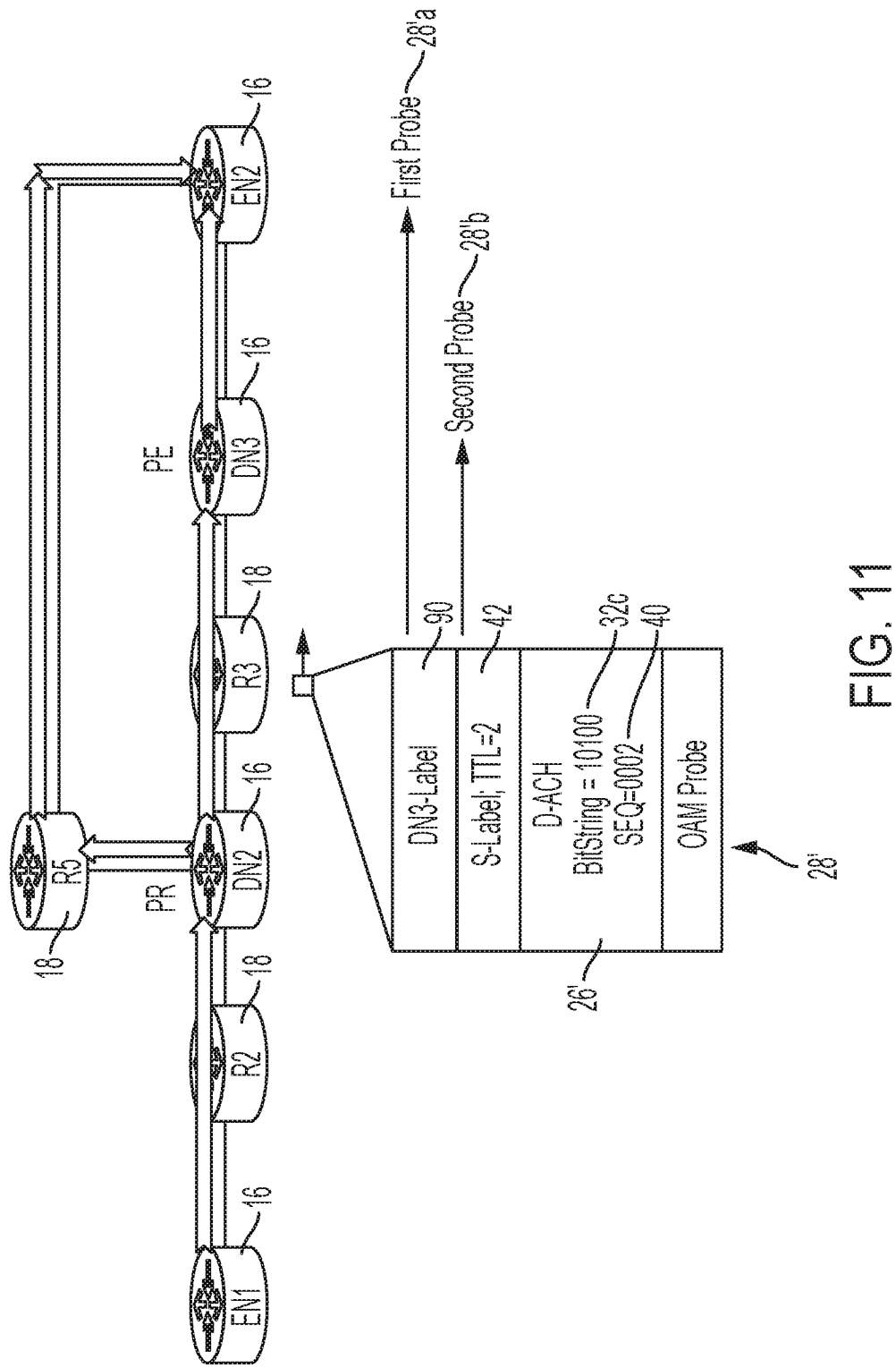
FIG. 11 illustrates self-initiated distributed validation of packet reordering by a DetNet device in the DetNet network of FIG. 6, according to an example embodiment.

FIGS. 8D and 11 illustrate next-hop PREOF validation. Each CPU 52 of each DetNet node 16 can validate the PREOF function of a NextHop DetNet nodes and upon detecting any failure, the CPU 52 can log an error message and trigger any protection mechanism for the DetNet forwarding hardware circuitry 38. The PR and PO functionality is similar to Self PREOF validation, except that CPU 52 of the validating node DN2 of FIG. 11 sets in operation 140 the bistring 32c to the next hop (NNHOP) bitstring "00100" for DN3. In order to detect the PE functionality of a NextHop DetNet node DN3, the CPU 52 of the validating node DN2 of FIG. 11 in operation 142 can cause its DetNet forwarding hardware circuitry 38 to send two d-OAM probe messages 28' (illustrated in FIG. 11 as 28'a and 28'b) with the same sequence number "0002" 40.

The first d-OAM probe message 28'a causes the DetNet forwarding hardware circuitry 38 of the NextHop DetNet node DN3 under test to create in operation 144 a state entry in its local table and forward the d-OAM probe message 28'a to EN2, while the second d-OAM probe message 28'b should be eliminated by DetNet forwarding hardware circuitry 38 of the NextHop DetNet node DN3 under test.

If the DetNet forwarding hardware circuitry 38 of the NextHop DetNode node DN3 under test eliminates in operation 146 the second d-OAM probe message 28'b, the DetNet forwarding hardware circuitry 38 of the node DN3 punts in operation 148 the second d-OAM probe message 28b' to its CPU 52, causing the CPU 52 of the node DN3 to generate and output (via the MAC circuitry 164) a reply indicating to the testing DN2 16 that the duplicate d-OAM probe message 28b' has been eliminated. Hence, the CPU 52 of the validating node DN2 in operation 150 determines successful packet elimination by the DetNet forwarding hardware circuitry 38 of the DN3 under test in response to receiving a response from the NextHop DetNet node DN3 "Packet eliminated". Receipt of any other probe response by the processor circuit 52 of the testing DN2 in operation 152 from the NextHop DetNet node DN3 under test is a failure. In response to detecting any failure with Remote/NextHop PREOF validation, the validating node DN2 can execute any protection mechanism necessary to address the failure.

In a variation of the above-described techniques, promiscuous detection techniques also can be applied, where a testing DetNet Device can promiscuously detect wireless d-OAM probe messages 28 transmitted by neighboring network devices to determine a validation status, instead of relying solely on loop-back techniques.

Figure 12:
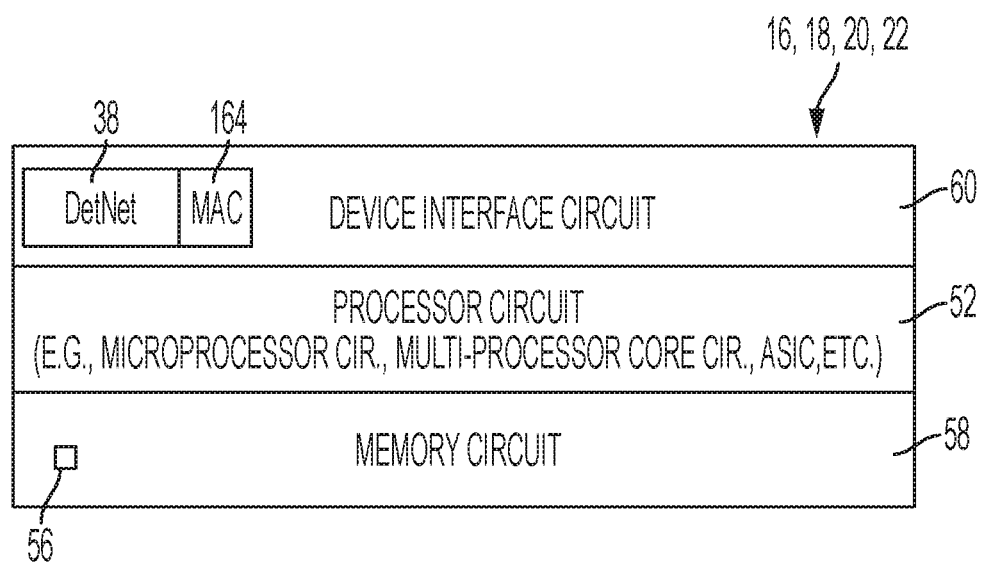
FIG. 12 illustrates an example implementation of any of the devices of the previous Figures, according to an example embodiment.

FIG. 12 illustrates an example implementation of any one of the devices 16, 18, 20, 22, according to an example embodiment. Each device 16, 18, 20, 22 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 16, 18, 20, 22 can include a device interface circuit 60, a processor circuit 52, and a memory circuit 58. The device interface circuit 60 can include one or more distinct physical layer transceivers for communication with any one of the other devices 16, 18, 20, 22, for example an IEEE based Ethernet/Media Access Control (MAC) transceiver 164 for communications with the devices of FIG. 1 via any type of data link (e.g., a wired or wireless link, an optical link, etc.). The device interface circuit 60 of the DetNet devices 16 (and possibly the DetNet controller device 20) also include a DetNet-compliant forwarding hardware circuit 38 configured for high-speed forwarding operations according to DetNet SLA requirements; in contrast, the device interface circuit 60 of the non-DetNet capable transit nodes 18 do not include a DetNet-compliant forwarding hardware circuit 38.

The processor circuit 52 (also referred to herein as a CPU) can be configured for executing any of the operations described herein, and the memory circuit 58 can be configured for storing any data or data packets as described herein.

Any of the disclosed circuits of the devices 16, 18, 22, 22 (including the device interface circuit 60, the processor circuit 52, the memory circuit 58, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 58) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 58 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 58 can be implemented dynamically by the processor circuit 52, for example based on memory address assignment and partitioning executed by the processor circuit 52.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

establishing, by a network device in an Internet Protocol (IP) data network, a wireless deterministic network (DetNet) track for an identified DetNet flow of DetNet packets, and the DetNet track comprising DetNet devices connected by allocated DetNet segments, each DetNet device configured for providing guaranteed deterministic transport of the identified DetNet flow along the corresponding allocated DetNet segment, each allocated DetNet segment distinct from an IP-based connection sharing a data link with the allocated DetNet segment;

causing, by the network device, one or more of the DetNet devices to execute distributed validating of any one or more DetNet operations by a DetNet forwarding hardware circuit in a DetNet device under test among the DetNet devices, the distributed validating including:

generating a DetNet Operations, Administration and Management (OAM) (d-OAM) probe message comprising an Associated Channel Header (ACH) specifying a DetNet validation identifier and a selected bitstring, the selected bitstring identifying (1) at least one of selected DetNet segments among the allocated DetNet segments, or (2) at least one of selected DetNet devices among the DetNet devices, validating the DetNet forwarding hardware circuit based on outputting the d-OAM probe message, the d-OAM probe message causing one or more of the DetNet devices to selectively generate an IP-based probe response indicating whether the any one or more DetNet operations was executed by the DetNet forwarding hardware circuit, the IP-based probe response generated based on the DetNet validation identifier and the selected bitstring causing the corresponding DetNet forwarding hardware circuit to punt the d-OAM probe message to a corresponding processor circuit that generates the IP-based probe response independent of an execution speed of any DetNet forwarding hardware circuit.

2. The method of claim 1, wherein:

the network device is one of a DetNet controller inside the IP data network and outside the DetNet track, or one of the DetNet devices;

the outputting of the d-OAM probe message includes at least one of:

outputting the d-OAM probe message upstream relative to the DetNet track along the corresponding IP-based connection for self-validation of the one DetNet device outputting the d-OAM probe message executing distributed validating as the DetNet device under test; or outputting the d-OAM probe message along the DetNet track on one or more of the corresponding allocated DetNet segments.

3. The method of claim 1, wherein:

the selected bitstring identifies at least one of the selected DetNet segments among the allocated segments and the DetNet validation identifier identifies end-to-end validation of all the DetNet devices of the DetNet track;

the distributed validating initiated by the processor circuit in an DetNet ingress for the DetNet track and generating the selected bitstring for the end-to-end validation all the DetNet devices, based on the processor circuit in the DetNet ingress determining whether the IP-based probe responses clear respective bits of a locally-generated variable corresponding to the selected bitstring.

4. The method of claim 1, wherein:

the selected bitstring identifies at least one of the selected DetNet segments among the allocated segments and the DetNet validation identifier identifies conditional validation of a selected subset the DetNet devices of the DetNet track;

the distributed validating initiated by the processor circuit in an DetNet ingress for the DetNet track and generating the selected bitstring for end-to-end validation of the selected subset the DetNet devices of the DetNet track, based on the processor circuit in the DetNet ingress determining whether the IP-based probe responses clear respective bits of a locally-generated variable corresponding to the selected bitstring.

5. The method of claim 1, wherein:

the selected bitstring identifies at least one of the selected DetNet devices and the DetNet validation identifier identifies self packet-replication validation;

the distributed validating initiated by the processor circuit in an intermediate DetNet device in the DetNet track and generating the selected bitstring for the self packet-replication validation by the intermediate DetNet device, the distributed validating including:

the processor circuit in the intermediate DetNet device outputting the d-OAM probe message to a next-hop device upstream relative to the DetNet track, and the processor circuit in the intermediate DetNet device determining, from the IP-based probe response from one or more of the selected DetNet devices, whether the corresponding forwarding hardware circuit of the intermediate DetNet device forwarded the d-OAM probe message received from the next-hop device along the corresponding DetNet segment.

6. The method of claim 1, wherein:

the selected bitstring identifies at least one of the selected DetNet devices and the DetNet validation identifier identifies self packet-elimination validation;

the distributed validating initiated by the processor circuit in an intermediate DetNet device in the DetNet track and generating the selected bitstring for the self packet-elimination validation by the intermediate DetNet device, the distributed validating including:

the processor circuit in the intermediate DetNet device setting a duplication condition for the d-OAM probe message, the processor circuit in the intermediate DetNet device outputting the d-OAM probe message to a next-hop device upstream relative to the DetNet track, and the processor circuit in the intermediate DetNet device determining whether the corresponding forwarding hardware circuit of the intermediate DetNet device eliminated the d-OAM probe message received from the next-hop device along the corresponding DetNet segment, relative to the duplication condition, in response to an elimination notification from the corresponding forwarding hardware circuit; or the processor circuit in the intermediate DetNet device determining whether the corresponding forwarding hardware circuit of the intermediate DetNet device failed to eliminate the d-OAM probe message from the IP-based probe response from one or more of the selected DetNet devices.

7. The method of claim 1, wherein:

the selected bitstring identifies at least one of the selected DetNet devices and the DetNet validation identifier identifies self packet-ordering validation;

the distributed validating initiated by the processor circuit in an intermediate DetNet device in the DetNet track and generating the selected bitstring for the self packet-ordering validation by the intermediate DetNet device, the distributed validating including:

the processor circuit in the intermediate DetNet device outputting a plurality of the d-OAM probe messages, specifying out-of-order sequence values, to a next-hop device upstream relative to the DetNet track, and the processor circuit in the intermediate DetNet device determining, from the IP-based probe response from one or more of the selected DetNet devices, whether the corresponding forwarding hardware circuit of the intermediate DetNet device ordered the d-OAM probe messages received from the next-hop device along the corresponding DetNet segment.

8. The method of claim 1, wherein:

the selected bitstring identifies at least one of the selected DetNet devices and the DetNet validation identifier identifies remote packet-elimination validation;

the distributed validating initiated by the processor circuit in an intermediate DetNet device in the DetNet track and generating the selected bitstring for the remote packet-elimination validation by the intermediate DetNet device, the distributed validating including:

the processor circuit in the intermediate DetNet device outputting, along the DetNet track to the at least one selected DetNet device, the d-OAM probe message and a duplicated d-OAM message specifying the same sequence number, the processor circuit in the intermediate DetNet device determining whether the corresponding forwarding hardware circuit of the at least one selected DetNet device eliminated the duplicate d-OAM probe message based on the IP-based probe response; or the processor circuit in the intermediate DetNet device determining whether the corresponding forwarding hardware circuit of the at least one selected DetNet device failed to eliminate the duplicate d-OAM probe message based on a failure to receive the IP-based probe response.

9. The method of claim 1, wherein the validating includes promiscuously detecting, via a wireless data link, any one or more of the d-OAM probe message output by another DetNet device or the IP-based probe response.

10. One or more non-transitory tangible media encoded with logic for execution by a machine and when executed by the machine operable for:

establishing, by a network device in an Internet Protocol (IP) data network, a wireless deterministic network (DetNet) track for an identified DetNet flow of DetNet packets, and the DetNet track comprising DetNet devices connected by allocated DetNet segments, each DetNet device configured for providing guaranteed deterministic transport of the identified DetNet flow along the corresponding allocated DetNet segment, each allocated DetNet segment distinct from an IP-based connection sharing a data link with the allocated DetNet segment;

causing, by the network device, one or more of the DetNet devices to execute distributed validating of any one or more DetNet operations by a DetNet forwarding hardware circuit in a DetNet device under test among the DetNet devices, the distributed validating including:

generating a DetNet Operations, Administration and Management (OAM) (d-OAM) probe message comprising an Associated Channel Header (ACH) specifying a DetNet validation identifier and a selected bitstring, the selected bitstring identifying (1) at least one of selected DetNet segments among the allocated DetNet segments, or (2) at least one of selected DetNet devices among the DetNet devices, validating the DetNet forwarding hardware circuit based on outputting the d-OAM probe message, the d-OAM probe message causing one or more of the DetNet devices to selectively generate an IP-based probe response indicating whether the any one or more DetNet operations was executed by the DetNet forwarding hardware circuit, the IP-based probe response generated based on the DetNet validation identifier and the selected bitstring causing the corresponding DetNet forwarding hardware circuit to punt the d-OAM probe message to a corresponding processor circuit that generates the IP-based probe response independent of an execution speed of any DetNet forwarding hardware circuit.

11. The one or more non-transitory tangible media of claim 10, wherein:
the network device is one of a DetNet controller inside the IP data network and outside the DetNet track, or one of the DetNet devices;
the outputting of the d-OAM probe message includes at least one of:
outputting the d-OAM probe message upstream relative to the DetNet track along the corresponding IP-based connection for self-validation of the one DetNet device outputting the d-OAM probe message executing distributed validating as the DetNet device under test; or
outputting the d-OAM probe message along the DetNet track on one or more of the corresponding allocated DetNet segments.

12. The one or more non-transitory tangible media of claim 10, wherein:
the selected bitstring identifies at least one of the selected DetNet segments among the allocated segments and the DetNet validation identifier identifies end-to-end validation of all the DetNet devices of the DetNet track;
the distributed validating initiated by the processor circuit in an DetNet ingress for the DetNet track and generating the selected bitstring for the end-to-end validation all the DetNet devices, based on the processor circuit in the DetNet ingress determining whether the IP-based probe responses clear respective bits of a locally-generated variable corresponding to the selected bitstring.

13. The one or more non-transitory tangible media of claim 10, wherein:
the selected bitstring identifies at least one of the selected DetNet segments among the allocated segments and the DetNet validation identifier identifies conditional validation of a selected subset the DetNet devices of the DetNet track;
the distributed validating initiated by the processor circuit in an DetNet ingress for the DetNet track and generating the selected bitstring for end-to-end validation of the selected subset the DetNet devices of the DetNet track, based on the processor circuit in the DetNet ingress determining whether the IP-based probe responses clear respective bits of a locally-generated variable corresponding to the selected bitstring.

14. The one or more non-transitory tangible media of claim 10, wherein:

the selected bitstring identifies at least one of the selected DetNet devices and the DetNet validation identifier identifies self packet-replication validation;
the distributed validating initiated by the processor circuit in an intermediate DetNet device in the DetNet track and generating the selected bitstring for the self packet-replication validation by the intermediate DetNet device, the distributed validating including:
the processor circuit in the intermediate DetNet device outputting the d-OAM probe message to a next-hop device upstream relative to the DetNet track, and
the processor circuit in the intermediate DetNet device determining, from the IP-based probe response from one or more of the selected DetNet devices, whether the corresponding forwarding hardware circuit of the intermediate DetNet device forwarded the d-OAM probe message received from the next-hop device along the corresponding DetNet segment.

15. The one or more non-transitory tangible media of claim 10, wherein:
the selected bitstring identifies at least one of the selected DetNet devices and the DetNet validation identifier identifies self packet-elimination validation;
the distributed validating initiated by the processor circuit in an intermediate DetNet device in the DetNet track and generating the selected bitstring for the self packet-elimination validation by the intermediate DetNet device, the distributed validating including:
the processor circuit in the intermediate DetNet device setting a duplication condition for the d-OAM probe message,
the processor circuit in the intermediate DetNet device outputting the d-OAM probe message to a next-hop device upstream relative to the DetNet track, and
the processor circuit in the intermediate DetNet device determining whether the corresponding forwarding hardware circuit of the intermediate DetNet device eliminated the d-OAM probe message received from the next-hop device along the corresponding DetNet segment, relative to the duplication condition, in response to an elimination notification from the corresponding forwarding hardware circuit; or
the processor circuit in the intermediate DetNet device determining whether the corresponding forwarding hardware circuit of the intermediate DetNet device failed to eliminate the d-OAM probe message from the IP-based probe response from one or more of the selected DetNet devices.

16. The one or more non-transitory tangible media of claim 10, wherein:
the selected bitstring identifies at least one of the selected DetNet devices and the DetNet validation identifier identifies self packet-ordering validation;
the distributed validating initiated by the processor circuit in an intermediate DetNet device in the DetNet track and generating the selected bitstring for the self packet-ordering validation by the intermediate DetNet device, the distributed validating including:
the processor circuit in the intermediate DetNet device outputting a plurality of the d-OAM probe messages, specifying out-of-order sequence values, to a next-hop device upstream relative to the DetNet track, and
the processor circuit in the intermediate DetNet device determining, from the IP-based probe response from one or more of the selected DetNet devices, whether the corresponding forwarding hardware circuit of the intermediate DetNet device ordered the d-OAM probe messages received from the next-hop device along the corresponding DetNet segment.

17. The one or more non-transitory tangible media of claim 10, wherein:
   the selected bitstring identifies at least one of the selected DetNet devices and the DetNet validation identifier identifies remote packet-elimination validation;
   the distributed validating initiated by the processor circuit in an intermediate DetNet device in the DetNet track and generating the selected bitstring for the remote packet-elimination validation by the intermediate DetNet device, the distributed validating including:
   the processor circuit in the intermediate DetNet device outputting, along the DetNet track to the at least one selected DetNet device, the d-OAM probe message and a duplicated d-OAM message specifying the same sequence number,
   the processor circuit in the intermediate DetNet device determining whether the corresponding forwarding hardware circuit of the at least one selected DetNet device eliminated the duplicate d-OAM probe message based on the IP-based probe response; or
   the processor circuit in the intermediate DetNet device determining whether the corresponding forwarding hardware circuit of the at least one selected DetNet device failed to eliminate the duplicate d-OAM probe message based on a failure to receive the IP-based probe response.

18. The one or more non-transitory tangible media of claim 10, wherein the validating includes promiscuously detecting, via a wireless data link, any one or more of the d-OAM probe message output by another DetNet device or the IP-based probe response.

19. An apparatus implemented as a physical machine, the apparatus comprising:
   non-transitory machine readable media configured for storing executable machine readable code;
   a device interface circuit comprising a deterministic network (DetNet) forwarding hardware circuit; and
   a processor circuit configured for executing the machine readable code, and when executing the machine readable code operable for:
   establishing, by the apparatus implemented as a network device in an Internet Protocol (IP) data network, a wireless DetNet track for an identified DetNet flow of DetNet packets, and the DetNet track comprising DetNet devices connected by allocated DetNet segments, each DetNet device configured for providing guaranteed deterministic transport of the identified DetNet flow along the corresponding allocated DetNet segment, each allocated DetNet segment distinct from an IP-based connection sharing a data link with the allocated DetNet segment;
   causing, by the network device, one or more of the DetNet devices to execute distributed validating of any one or more DetNet operations by a DetNet forwarding hardware circuit in a DetNet device under test among the DetNet devices, the distributed validating including:
   generating a DetNet Operations, Administration and Management (OAM) (d-OAM) probe message comprising an Associated Channel Header (ACH) specifying a DetNet validation identifier and a selected bitstring, the selected bitstring identifying (1) at least one of selected DetNet segments among the allocated DetNet segments, or (2) at least one of selected DetNet devices among the DetNet devices,
   validating the DetNet forwarding hardware circuit based on outputting the d-OAM probe message, the d-OAM probe message causing one or more of the DetNet devices to selectively generate an IP-based probe response indicating whether the any one or more DetNet operations was executed by the DetNet forwarding hardware circuit,
   the IP-based probe response generated based on the DetNet validation identifier and the selected bitstring causing the corresponding DetNet forwarding hardware circuit to punt the d-OAM probe message to a corresponding processor circuit that generates the IP-based probe response independent of an execution speed of any DetNet forwarding hardware circuit.

20. The apparatus of claim 19, wherein:
   the network device is one of a DetNet controller inside the IP data network and outside the DetNet track, or one of the DetNet devices;
   the outputting of the d-OAM probe message includes at least one of:
   outputting the d-OAM probe message upstream relative to the DetNet track along the corresponding IP-based connection for self-validation of the one DetNet device outputting the d-OAM probe message executing distributed validating as the DetNet device under test; or
   outputting the d-OAM probe message along the DetNet track on one or more of the corresponding allocated DetNet segments.

\* \* \* \* \*